(12) United States Patent
Nishikitani et al.

(10) Patent No.: US 6,208,452 B1
(45) Date of Patent: Mar. 27, 2001

(54) ELECTROCHROMIC DEVICE

(75) Inventors: Yoshinori Nishikitani; Izuru Sugiura; Masaaki Kobayashi; Hiroshi Imafuku, all of Yokohama (JP)

(73) Assignee: Nippon Mitsubishi Oil Corporation, Tokyo (JP)

( * ) Notice: Subject to any disclaimer, the term of this patent is extended or adjusted under 35 U.S.C. 154(b) by 0 days.

(21) Appl. No.: 09/425,330

(22) Filed: Oct. 22, 1999

(30) Foreign Application Priority Data

Oct. 22, 1998 (JP) .................................................. 10-300764

(51) Int. Cl.$^7$ ..................................................... G02F 1/153
(52) U.S. Cl. .............................. 359/270; 359/265; 359/268
(58) Field of Search .................................... 359/265, 270, 359/268

(56) References Cited

U.S. PATENT DOCUMENTS

| | | | | |
|---|---|---|---|---|
| 4,715,691 | * | 12/1987 | Sata et al. ........................... | 359/267 |
| 4,902,108 | * | 2/1990 | Byker ................................. | 359/265 |
| 5,068,062 | * | 11/1991 | Inata et al. .......................... | 252/518 |
| 5,310,829 | * | 5/1994 | Yamamoto et al. ................. | 525/540 |
| 5,859,722 | * | 1/1999 | Suga et al. .......................... | 359/265 |
| 5,883,220 | * | 3/1999 | Armand et al. ...................... | 528/322 |
| 5,995,273 | * | 11/1999 | Chandrasekhar .................... | 359/270 |
| 6,020,987 | * | 2/2000 | Baumann et al. ................... | 359/273 |
| 6,023,364 | * | 2/2000 | Kobayashi et al. ................. | 359/265 |

FOREIGN PATENT DOCUMENTS 2-110187 * 4/1990 (JP) .

* cited by examiner

Primary Examiner—Georgia Epps
Assistant Examiner—Evelyn A. Lester
(74) Attorney, Agent, or Firm—Akin, Gump, Strauss, Hauer & Feld, L.L.P.

(57) ABSTRACT

The electrochromic device which has an ion conductive layer obtained by curing a composition comprising (a) a bipyridinium compound represented by formula (1), (b) a specific amine compound and (c) a precursor component of a polymeric solid electrolyte, disposed between two electrically conductive substrates at least one of which is transparent, said formula (1) being

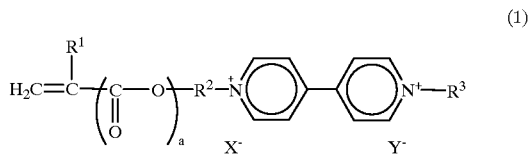

(1)

wherein X— and Y— are the same or different and are each independently a counter anion selected from the group consisting of an halogen anion, $ClO_4$—, $BF_4$—, $PF_6$—, $CH_3COO$— and $CH_3(C_6H_4)SO_3$—, $R^1$ is hydrogen or a $C_1$–$C_5$ alkyl group, $R^2$ is a $C_1$–$C_{30}$ divalent hydrocarbon or oxygen-containing hydrocarbon group, $R^3$ is a $C_1$–$C_{20}$ hydrocarbon or oxygen-containing hydrocarbon group and a is an integer of 0 or 1.

6 Claims, 1 Drawing Sheet

ELECTROCHROMIC DEVICE

BACKGROUND OF THE INVENTION

1. Field of the Invention

This invention relates to electrochromic devices which are useful for transmission-type device such as smart windows, reflective-type devices such as antiglare mirrors for automobiles and decorative mirrors and displays.

2. Description of the Prior Art

Japanese Laid-Open Patent Publication No. 63-18336 discloses a method of producing a chromogenic layer used for an electrochromic device by vacuum-depositing or sputtering an inorganic oxide such as tungsten oxide ($WO_3$) over a transparent electrically conductive film. However, this method leads to elevated production costs due to the involvement of technique under vacuum conditions.

It has been proposed to produce a chromogenic layer by using an electrochromic compound such as viologen and an electron donating compounds in combination without employing a technique involving vacuum conditions.

For example, Japanese Laid-Open Patent Publication No. 9-120088 discloses a solution for an electrochromic device which is obtained by dissolving an electrochromic compound such as viologen and an electron donating compound in a suitable solvent. However, this attempt has a problem that the resulting electrochromic device is deteriorated in electrochromic performances since viologen which is freely present in the solvent, is easily dimerized, leading to precipitation. Furthermore, there is a risk that the liquid medium possibly scatters upon breakage of the device.

Japanese Laid-Open Patent Publication No. 7-70218 discloses a solid chromogenic layer produced by dispersing an electrochromic compound such as viologen and an electron donating compound in a polymer with the aid of a monomer which can be polymerized by irradiating electromagnetic radiation. Since the solid medium is used in this chromogenic layer, there is no risk that the medium scatters upon breakage of the device. However, the viologen is still freely present even in the solid medium and thus easily precipitates by being dimerized, resulting in a failure of completely avoiding the resulting electrochromic device from being deteriorated.

Furthermore, the viologen and electron donating compound are changed in properties by ultraviolet ray penetrating through the substrate of the device, leading to the shortened lifetime thereof.

SUMMARY OF THE INVENTION

After an extensive research and study, it has been found that the foregoing problems can be overcome by an electrochromic device having a structure described below.

According to one aspect of the present invention, there is provided an electrochromic device having an ion conductive layer obtained by curing a composition containing (a) a bipyridinium compound represented by formula (1), (b) an amine compound represented by formula (2) and/or (3) and (c) a precursor component of a polymeric solid electrolyte, disposed between two electrically conductive substrates at least one of which is transparent, formula (1) being

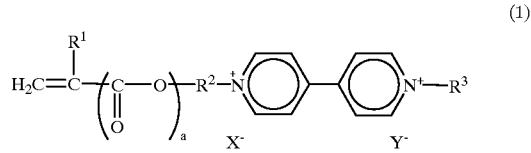

(1)

wherein X— and Y— may be the same or different and are each independently a counter anion selected from the group consisting of an halogen anion, $ClO_4$—, $BF_4$—, $PF_6$—, $CH_3COO$— and $CH_3(C_6H_4)SO_3$—, $R^1$ is hydrogen or a $C_1$–$C_5$ alkyl group, $R^2$ is a $C_1$–$C_{30}$ divalent hydrocarbon residue, $R^3$ is a $C_1$–$C_{20}$ hydrocarbon residue and a is an integer of 0 or 1; formula (2) being

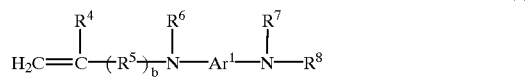

(2)

wherein $R^4$ is hydrogen or a $C_1$–$C_5$ alkyl group, $R^5$ is a $C_1$–$C_{15}$ hydrocarbon residue, b is an integer of 0 or 1, $R^6$ and $R^7$ may be the same or different and are each independently hydrogen or a $C_1$–$C_{20}$ hydrocarbon residue, $R^8$ is hydrogen or a $C_1$–$C_{20}$ hydrocarbon residue and $Ar^1$ is a $C_6$–$C_{20}$ divalent aromatic hydrocarbon residue; and formula (3) being

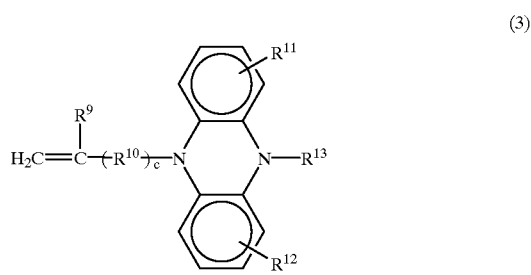

(3)

wherein $R^9$ is hydrogen or a $C_1$–$C_5$ alkyl group, $R^{10}$ is a $C_1$–$C_{15}$ hydrocarbon residue, c is an integer of 0 or 1, $R^{11}$ and $R^{12}$ may be the same or different and are each independently hydrogen or a $C_1$–$C_{20}$ hydrocarbon residue and $R^{13}$ is hydrogen or a $C_1$–$C_{20}$ hydrocarbon residue.

According to the other aspect of the present invention, there is provided an electrochromic device having the ion conductive layer obtained by curing the composition further containing (d) an ultraviolet absorbing compound having an ethylenic double bond.

PREFERRED EMBODIMENTS OF THE INVENTION

Figure 1:
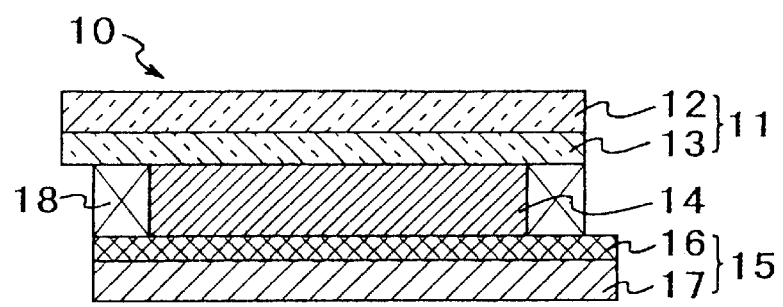
FIG. 1 is a cross-sectional view showing the structure of an electrochromic device according to the present invention.

The electrochromic device according to the present invention is comprised of two electrically conductive substrates.

The term "electrically conductive substrate" refers to a substrate having a function as an electrode. Therefore, the electrically conductive substrates used herein encompass those made from electrically conductive materials and those obtained by laminating an electrically conductive layer over one or both surfaces of a non-electrically conductive substrate. No matter whether the substrates are electrically conductive or not, it is required to have a smooth surface at normal temperature. The surface; however, may be flat or curved as well as deformable under stress.

At least one of the electrically conductive substrates is transparent and the other may be transparent or opaque or may be a reflective electrically conductive substrate which can reflect light.

Generally, a device having electrically conductive substrates both of which are transparent is suitable for displays and smart windows glasses. A device having a electrically conductive transparent substrate and an opaque one is suitable for displays. A device having a transparent electrically conductive substrate and a reflective one is suitable for electrochromic mirror.

The transparent electrically conductive substrate may be produced by laminating a transparent electrode layer over a transparent substrate. The term "transparent" denotes optical transmission ranging from 10 to 100 percent.

No particular limitation is imposed on a material of the transparent substrate, which may be color or colorless glasses, reinforced glasses or color or colorless transparent resins. Specific examples of such resins are polyethylene terephthalate, polyethylene naphthalate, polyamide, polysulfone, polyether sulfone, polyether etherketone, polyphenylene sulfide, polycarbonate, polyimide, polymethyl methacrylate and polystyrene.

The transparent electrode layer may be a metal thin film of gold, silver, chrome, copper and tungsten or an electrically conductive thin film of metal oxides. Specific examples of the metal oxides are ITO ($In_2O_3$—$SnO_2$), tin oxide, silver oxide, zinc oxide and vanadium oxide. The film thickness is usually within the range of 10 to 500 nm, preferably 50 to 300 nm. The surface resistance of the film is within the range of usually 0.5 to 500 $\Omega/cm^2$, preferably 1 to 50 $\Omega/cm^2$. Any suitable method of forming a transparent electrode layer may be employed depending on the type of metals and/or metal oxides constituting the electrode. The transparent electrode layer may be formed by vacuum evaporation, ion-plating, sputtering and a sol-gel method.

For the purpose of imparting oxidation-reduction capability and electric double layer capacitance and improving electric conductivity, an opaque electrode activator may be partially applied to the surface of the transparent electrode layer. The electrode activator may be a metal such as copper, silver, gold, platinum, iron, tungsten, titanium and lithium and an organic material having oxidation-reduction capability, such as polyaniline, polythiophen, polypyrrole and phthalocyanine, a carbon material such as active carbon and graphite a metal oxide such as $V_2O_5$, $MnO_2$, NiO and $Ir_2O_3$ and a mixture thereof.

Upon forming the electrode activator over the transparent electrode layer, it is necessary not to harm the transparency thereof excessively. Therefore, the opaque electrode activator may be applied onto an electrode by forming thin stripes or dots of a composition comprising an active carbon fiber, graphite and an acrylic resin over a transparent ITO layer or forming a mesh of a composition comprising $V_2O_5$, acetylene black and butyl rubber over a gold thin film.

The opaque electrically conductive substrate may be produced by substituting the transparent substrate of the above-described transparent electrically conductive substrate with an opaque substrate such as various plastics, glasses, woods and stones.

Eligible reflective electrically conductive substrates for the present invention are (1) laminates obtained by laminating a reflective electrode layer over a non-electrically conductive transparent or opaque substrate, (2) laminates obtained by laminating a transparent electrode layer over one surface of a non-electrically conductive transparent substrate and a reflective layer over the other surface thereof, (3) laminates obtained by laminating a reflective layer over a non-electrically conductive transparent substrate and a transparent electrode layer over the reflective layer, (4) laminates obtained by laminating a transparent electrode layer over a reflective plate used as a substrate and (5) plate-like substrates which themselves have functions as a photo-reflective layer and an electrode layer.

The term "reflective electrode layer" denotes a thin film which has a mirror surface and is electorchemically stable in performance as an electrode. Specific examples of such a thin film are a metal film of gold, platinum, tungsten, tantalum, rhenium, osmium, iridium, silver, nickel or palladium and an alloy film of platinum-palladium, platinum-rhodium or stainless. Any suitable method of forming such a thin film may be employed such as vacuum evaporation, ion-plating and sputtering.

The substrate to be provided with a reflective electrode layer may be transparent or opaque. Therefore, the substrate may be the above-described transparent substrate and various plastics, glasses, woods and stones which may not be transparent.

The term "reflective plate" or "reflective layer" denotes a substrate having a mirror surface or a thin film which may be a plate of silver, chrome, aluminum, stainless, nickel-chrome or a thin film thereof.

If the above described reflective electrode layer per se is rigid, a substrate may not be used.

In the present invention, a bipyridinium compound is used as an electrochromic material and represented by the formula

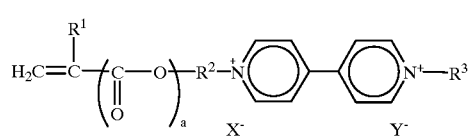

(1)

The bipyridinium compound is hereinafter referred to as Component (A). In formula (1), X— and Y— may be the same or different and are each independently a counter anion selected from the group consisting of an halogen anion, $ClO_4$—, $BF_4$—, $PF_6$—, $CH_3COO$— and $CH_3(C_6H_4)SO_3$—. The halogen anion may be F—, Cl—, Br—and I—.

$R^1$ may be hydrogen or a $C_1$–$C_5$ alkyl group. Specific examples of the alkyl group are methyl, ethyl, i-propyl, n-propyl, n-butyl, t-butyl and n-pentyl group. Preferred are hydrogen and methyl group.

$R^2$ is a $C_1$–$C_{30}$ divalent hydrocarbon group. The term "hydrocarbon residue" refers to hydrocarbon groups and oxygen-containing hydrocarbon groups. The divalent hydrocarbon residues include hydrocarbon groups such as alkylene groups and divalent aromatic hydrocarbon groups as well as divalent oxygen-containing hydrocarbon groups having an ether bond, such as (poly)oxyalkylene groups. The alkylene group are those having 1 to 10, preferably 1 to 5 carbon atoms. Preferred examples of the alkylene group are methylene, ethylene, tetramethylene and propylene groups, among which methylene group is particularly preferred.

Typical examples of the divalent aromatic hydrocarbon groups are $C_6$–$C_{20}$ arylene or substituted arylene groups such as m-phenylene, n-phenylene, substituted phenylene (alkyl-substituted phenylene), biphenylene and naphthylene groups, among which m-phenylene and n-phenylene are preferred.

The oxygen-containing hydrocarbon group may be —$OCH_2CH_2$— and —$CH_2OCH_2CH_2$.

$R^3$ is a monovalent hydrocarbon residue having 1 to 20, preferably 2 to 10 carbon atoms. The hydrocarbon residue includes hydrocarbon groups and oxygen-containing hydrocarbon groups. Therefore, the monovalent hydrocarbon residue encompasses hydrocarbon groups such as alkyl groups, aryl groups and aralalkyl groups and alkoxy groups. Specific examples of the alkyl groups are methyl, ethyl, i-propyl, n-propyl, n-butyl, t-butyl, n-pentyl, n-hexyl, cyclohexyl, n-heptyl, n-octyl, benzyl and vinylbenzyl groups.

Alternatively, $R^3$ in formula (1) may be an oxygen-containing hydrocarbon groups represented by the formula

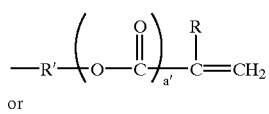

(a)

or

(b)

wherein R' is as defined with respect to $R^2$ in formula (1), R is as defined with respect to $R^1$ in formula (1), R" is an alkylene group having 2 to 5, preferably 2 to 3 carbon atoms, such as ethylene, trimethylene and propylene groups, a' is an integer of 0 or 1, b' is an integer of 1 to 5, preferably 1 or 2.

a in formula (1) is an integer of 0 or 1.

If $R^3$ is an oxygen-containing hydrocarbon group of formula (a), Component (A) has carbon-carbon double bonds at both terminal ends, as represented by the formula

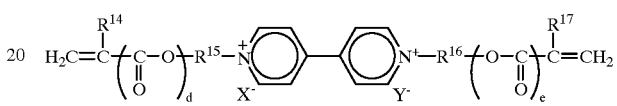

(4)

wherein X— and Y— may be the same or different and are each as defined in formula (1), $R^{14}$ and $R^{17}$ may be the same or different and are each as defined with respect to $R^1$ in formula (1), $R^{15}$ and $R^{16}$ may be the same or different and are each as defined with respect to $R^2$ in formula (1) and d and e may be the same or different and are each as defined with respect to a in formula (1).

Specific examples of Component (A) are as follows:

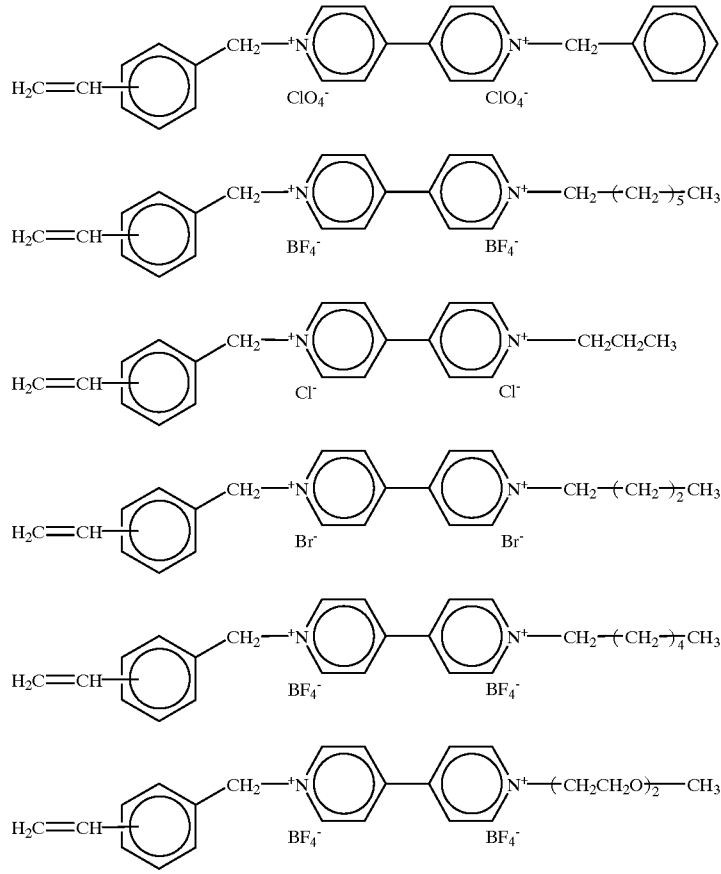

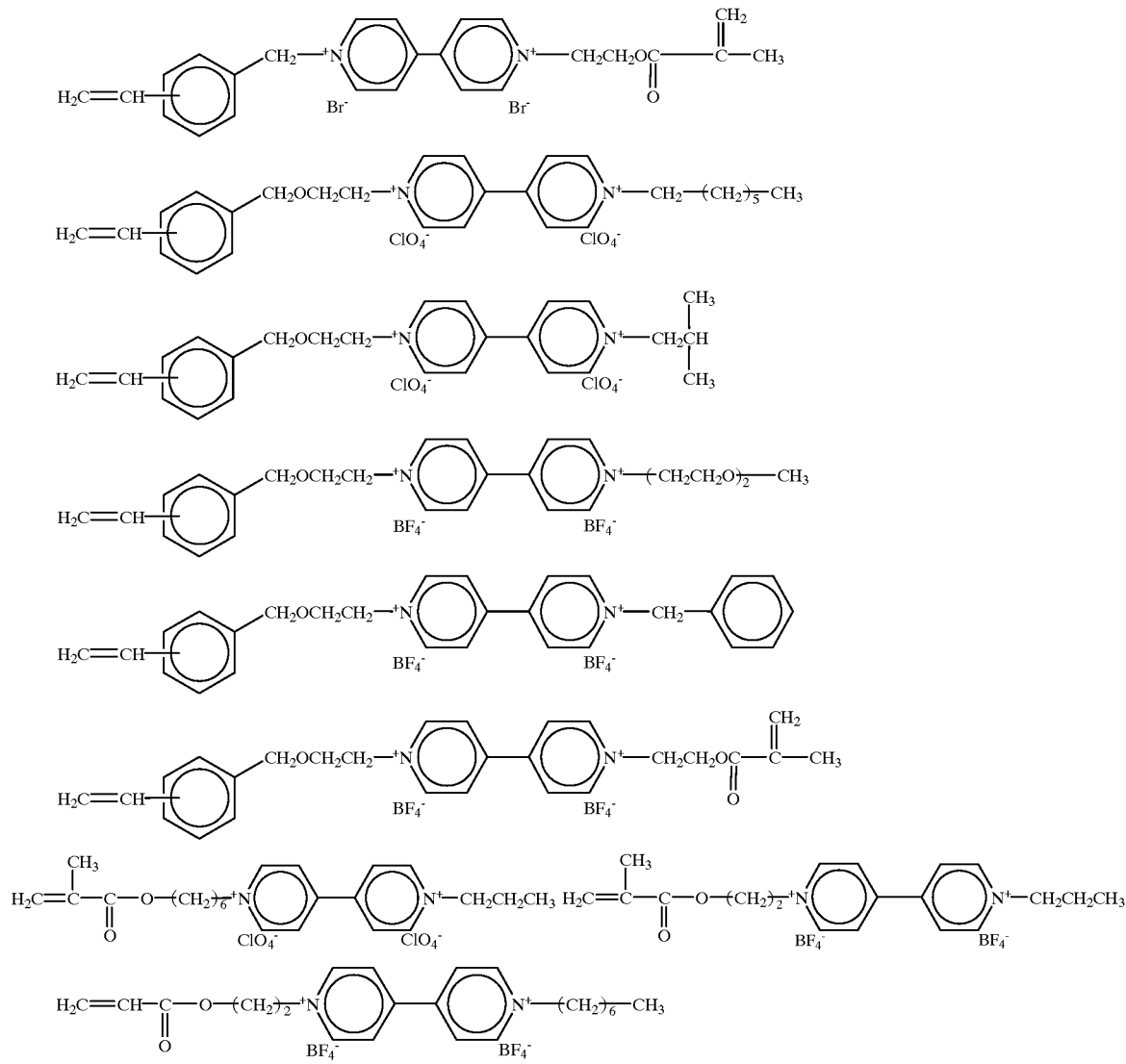

Two or more of these compounds may be used in combination. Component (A) may be used in combination with a compound facilitating color development. The color developing compound may be bonded to Component (A).

In the electrochromic device according to the present invention, an amine compound is used as a electron-donating compound. Such an amine compound may be those represented by formula (2) and/or (3) and hereinafter referred to as Component (B):

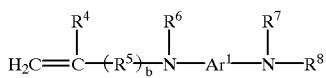

(2)

-continued

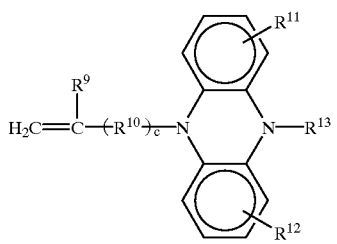

(3)

$R^4$ and $R^9$ in formulae (2) and (3) are each independently hydrogen or a $C_1-C_5$ alkyl group such as methyl, ethyl, i-propyl, n-propyl, n-butyl, t-butyl and n-pentyl groups. Particularly preferred are hydrogen and methyl groups. $R^5$ and $R^{10}$ are each independently a $C_1-C_{15}$ divalent hydrocarbon residue. Specific examples of the divalent hydrocarbon residue are those as represented by the following formulae:

—OCH₂CH₂—, —(OCH₂CH₂)₂—

—(OCH₂CH₂)₃—, —(OCH₂CH₂)₄—

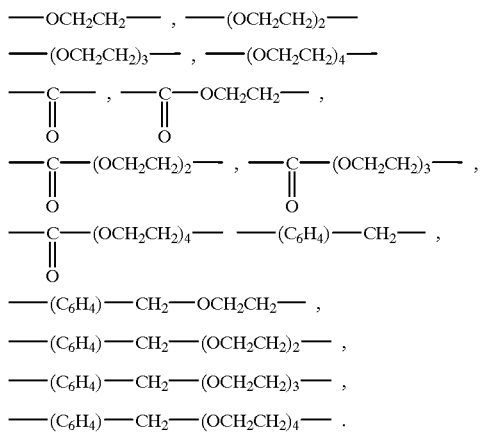

—(C₆H₄)—CH₂—OCH₂CH₂—,

—(C₆H₄)—CH₂—(OCH₂CH₂)₂—,

—(C₆H₄)—CH₂—(OCH₂CH₂)₃—,

—(C₆H₄)—CH₂—(OCH₂CH₂)₄—.

b and c in formulae (2) and (3) are each 0 or 1.

$R^6$ and $R^7$ in formula (2) and $R^{11}$ and $R^{12}$ in formula (3) are each independently hydrogen or a hydrocarbon residue having 1 to 20, preferably 1 to 10 carbon atoms. The hydrocarbon residue encompasses hydrocarbon groups and oxygen-containing hydrocarbon groups. Specific examples of the hydrocarbon groups are an alkyl group such as methyl, ethyl, n-propyl, i-propyl, n-butyl, i-butyl, t-butyl, hexyl, heptyl and octyl groups, alkylphenyl group such as tolyl and ethylphenyl groups and an aryl group such as phenyl group and an aralkyl group. The oxygen-containing hydrocarbon group may be an alkoxyphenyl group such as methoxyphenyl and ethoxyphenyl groups.

$R^8$ and $R^{13}$ are each independently hydrogen or a hydrocarbon residue having 1 to 20, preferably 1 to 10 carbon atoms. The hydrocarbon residue encompasses hydrocarbon groups and oxygen-containing hydrocarbon groups. Specific examples of the hydrocarbon group are an alkyl group such as methyl, ethyl, n-propyl, i-propyl, n-butyl, i-butyl, t-butyl, hexyl, heptyl and octyl groups, alkylphenyl group such as tolyl and ethylphenyl groups and an aryl group such as phenyl group and an aralkyl group. The oxygen-containing hydrocarbon group may be an alkoxyphenyl group such as methoxyphenyl and ethoxyphenyl groups or an oxygen-containing hydrocarbon group represented by formula (a) or (b):

(a)

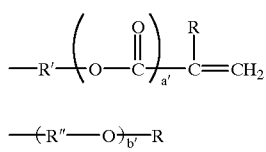

(b)

—(R″—O)_{b'}—R wherein R' is as defined with respect to $R^5$ in formula (2) or $R^{10}$ in formula (3), R is as defined with respect to $R^4$ in formula (2) or $R^9$ in formula (3), R″ is an alkylene group having 2 to 5, preferably 2 to 3 carbon atoms, such as ethylene, trimethylene and propylene groups, a' is an integer of 0 or 1, b' is an integer of 1 to 5, preferably 1 or 2.

$Ar^1$ in formula (2) is a divalent aromatic hydrocarbon group having 6 to 20, preferably 6 to 12 carbon atoms, o-phenylene, m-phenylene, p-phenylene, substituted phenylene group of which substituent may be as defined with respect to $R^5$, preferably alkyl-substituted phenylene group, biphenylene and naphthylene group.

If $R^{13}$ in formula (2) or (3) is a group of formula (a), Component (B) has carbon-carbon double bonds at the terminal ends, as represented by the formulae (5)

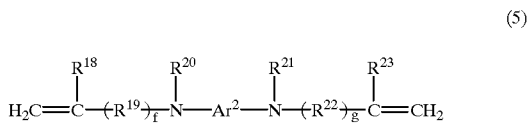

wherein $R^{18}$ and $R^{19}$ may be the same or different and are each independently as defined with respect to $R^4$ in formula (2), $R^{19}$ and $R^{22}$ may be the same or different and are each independently as defined with respect to $R^5$ in formula (2), $R^{20}$ and $R^{21}$ may be the same or different and are each independently as defined with respect to $R^6$ and $R^7$ in formula (2), $Ar^2$ is as defined with respect to $Ar^1$ in formula (2), and f and g may be the same or different and are each as defined with respect to b in formula (2), and (6)

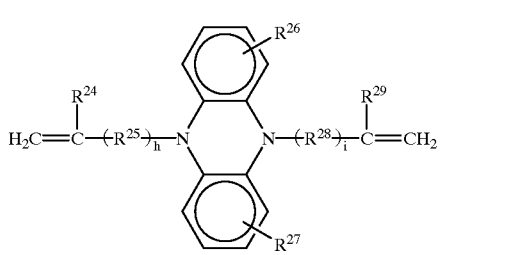

wherein $R^{24}$ and $R^{29}$ may be the same or different and are each independently as defined with respect to $R^9$ in formula (3), $R^{25}$ and $R^{28}$ may be the same or different and are each independently as defined with respect to $R^{10}$, $R^{25}$ and $R^{27}$ may be the same or different and are each independently as defined with respect to $R^{11}$ and $R^{12}$ in formula (3) and h and i may be the same or different and are each independently as defined with respect to c in formula (3).

Component (B) may be produced by reacting a specific amine compound with a specific reactive acid halide.

Amine compounds used as a starting material may be those represented by the formulae (7)

wherein $R^{30}$, $R^{31}$ and $R^{32}$ may be the same or different and are as defined with respect to $R^5$, $R^7$ and $R^8$ in formula (2), respectively, and (8)

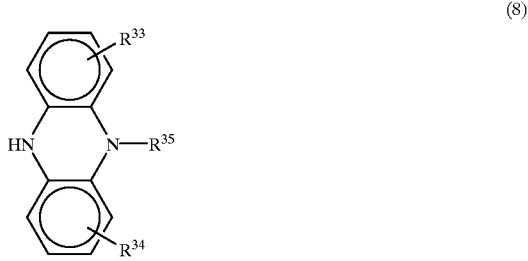

wherein $R^{33}$, $R^{34}$ and $R^{35}$ may be the same or different and are as defined with respect to $R^{11}$, $R^{12}$ and $R^{13}$ in formula (3), respectively.

Specific examples of the amine compound represented by formula (7) or (8) are phenylenediamine, N-methylphenylenediamine, N,N'-dimethylphenylenediamine, N,N,N'-trimethylphenylenediamine, N-ethylphenylenediamine, N,N'-diethylphenylenediamine, N,N,N'-triethylphenylenediamine, N-phenylphenylenediamine, N,N'-diphenylphenylenediamine, N,N,N'-triphenylphenylenediamine, N-tolylphenylenediamine, N,N'-tolylphenylenediamine, N,N,N'-tritolylphenylenediamine, N-(4-aminophenyl)-N'-phenylphenylenediamine, N-(4-aminophenyl)-N,N'-diphenylphenylenediamine, N-(4-aminophenyl)-N,N',N'-triphenylphenylenediamine, N-(4-aminophenyl)-N'-diphenylphenylenediamine, N-(4-aminophenyl)-N-tolylphenylenediamine, N-(4-aminophenyl)-N-phenyl-N'-tolylphenylenediamine, N-(4-aminophenyl)-N-tolyl-N'-phenylphenylenediamine, N-(4-aminophenyl)-N,N'-ditolylphenylenediamine, N-(4-aminophenyl)-N',N'-ditolylphenylenediamine, N-(4-aminophenyl)-N-phenyl-N',N'-ditolylphenylenediamine, N-(4-aminophenyl)-N,N'-diphenyl-N'-tolylphenylenediamine, N-(4-aminophenyl)-N,N',N'-tritolylphenylenediamine, N-(4-aminophenyl)-N-methylphenylenediamine, N-(4-aminophenyl)-N-phenyl-N'-methylphenylenediamine, N-(4-aminophenyl)-N-methyl-N'-phenylphenylenediamine, N-(4-aminophenyl)-N,N'-dimethylphenylenediamine, N-(4-aminophenyl)-N',N'-dimethylphenylenediamine, N-(4-aminophenyl)-N-phenyl-N',N'-dimethylphenylenediamine, N-(4-aminophenyl)-N,N'-diphenyl-N'-methylphenylenediamine, N-(4-aminophenyl)-N,N',N'-trimethylphenylenediamine, benzidine, N-methylbenzidine, N,N'-dimethylbenzidine, N,N,N'-trimethylbenzidine, N-ethylbenzidine, N,N'-diethylbenzidine, N,N,N'-triethylbenzidine, N-phenylbenzidine, N,N'-diphenylbenzidine, N,N,N'-triphenylbenzidine, N-tolylbenzidine, N,N'-tolylbenzidine, N,N,N'-tritolylbenzidine, N-(4-aminophenyl)-N'-phenylbenzidine, N-(4-aminophenyl)-N,N'-diphenylbenzidine, N-(4-aminophenyl)-N,N',N'-triphenylbenzidine, N-(4-aminophenyl)-N',N'-diphenylbenzidine, N-(4-aminophenyl)-N-tolylbenzidine, N-(4-aminophenyl)-N-phenyl-N'-tolylbenzidine, N-(4-aminophenyl)-N-tolyl-N'-phenylbenzidine, N-(4-aminophenyl)-N,N'-ditolylbenzidine, N-(4-aminophenyl)-N',N'-ditolyl benzidine, N-(4-aminophenyl)-N-phenyl-N,N'-ditolylbenzidine, N-(4-aminophenyl)-N,N'-diphenyl-N'-tolylbenzidine, N-(4-aminophenyl)-N,N',N'-tritolylbenzidine, N-(4-aminophenyl)-N-methylbenzidine, N-(4-aminophenyl)-N-phenyl-N'-methylbenzidine, N-(4-aminophenyl)-N-methyl-N-methyl-N'-phenylbenzidine, N-(4-aminophenyl)-N,N'-dimethylbenzidine, N-(4-aminophenyl)-N,N'-dimethylbenzidine, N-(4-aminophenyl)-N-phenyl-N',N'-dimethylbenzidine, N-(4-aminophenyl)-N,N'-diphenyl-N'-methylbenzidine, N-(4-aminophenyl)-N,N',N'-trimethylbenzidine, N,N,N',N'-tetramethyl-1,4-phenylenediamine and 5,10-dihydro-5,10-dimethylphenazine.

Acid halides to be used for the reaction with the above-described amine compound may be those represented by the formula

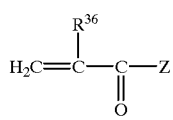

(9)

wherein $R^{36}$ is as defined with respect to $R^4$ in formula (2) and Z is a halogen atom such as fluorine, chlorine, bromine and iodine.

Specific examples of the reactive acid halide are chloride acrylate and chloride acrylate.

Specific examples of Component (B) are as follows and may be used in combination:

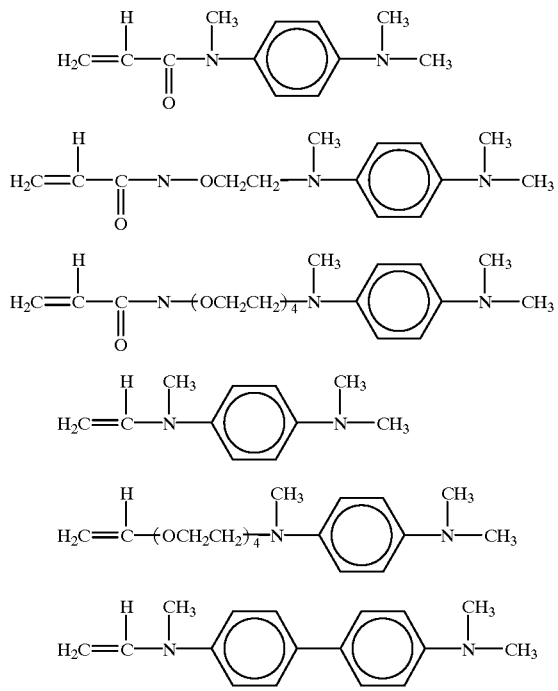
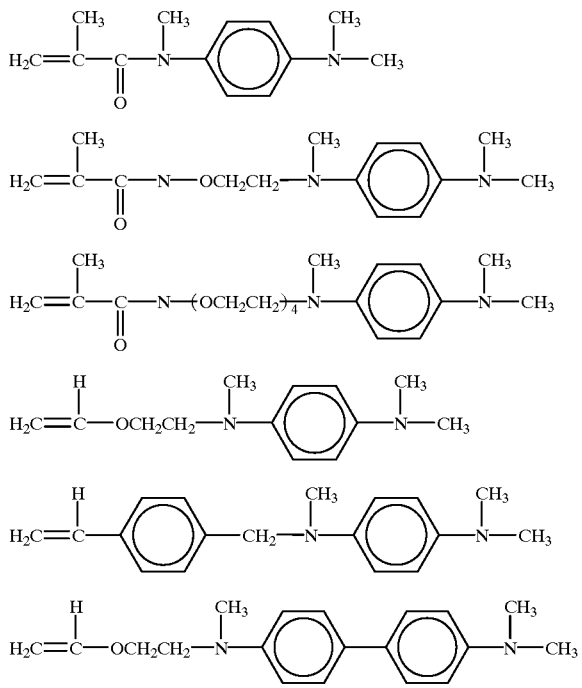

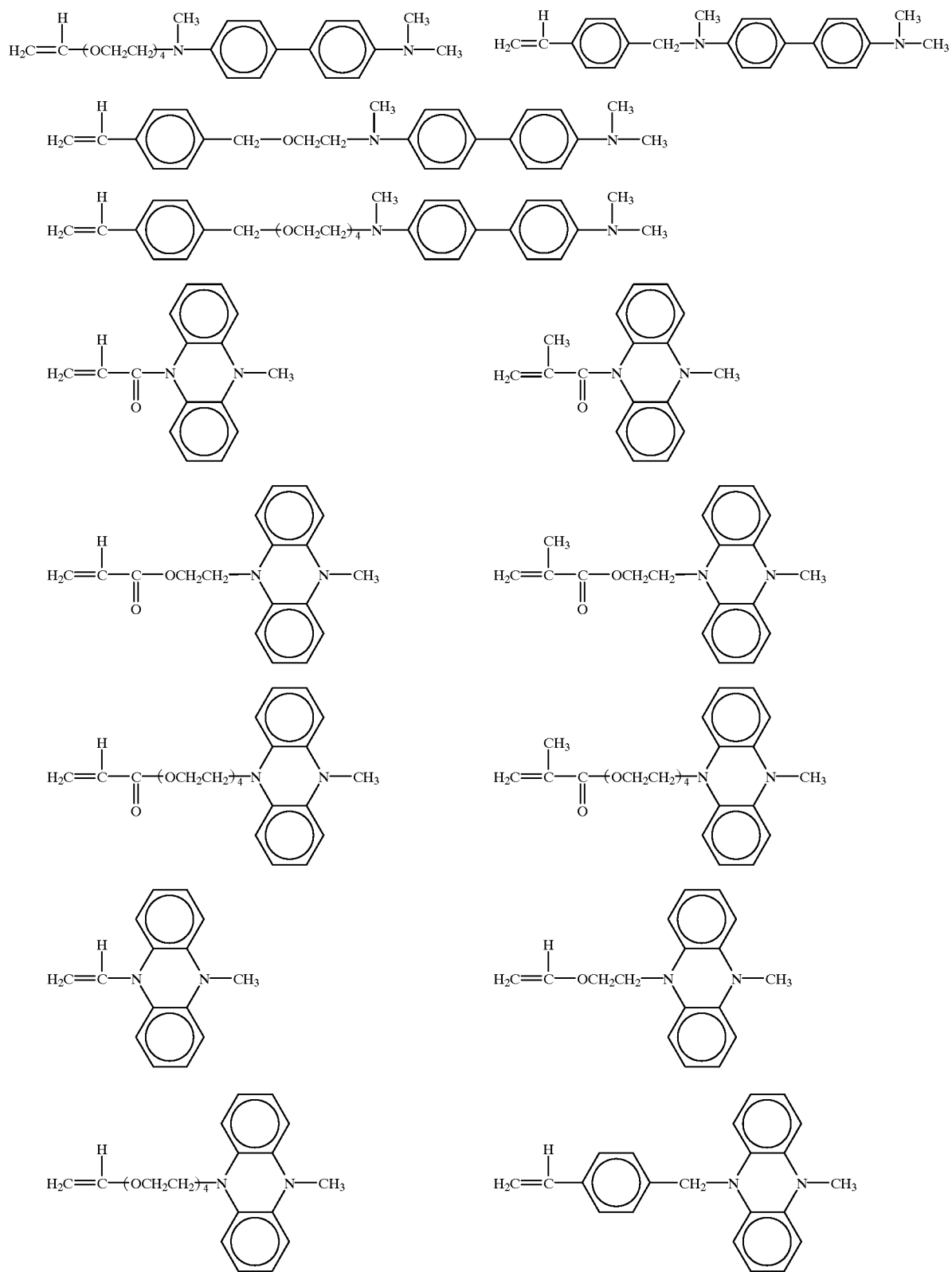

-continued

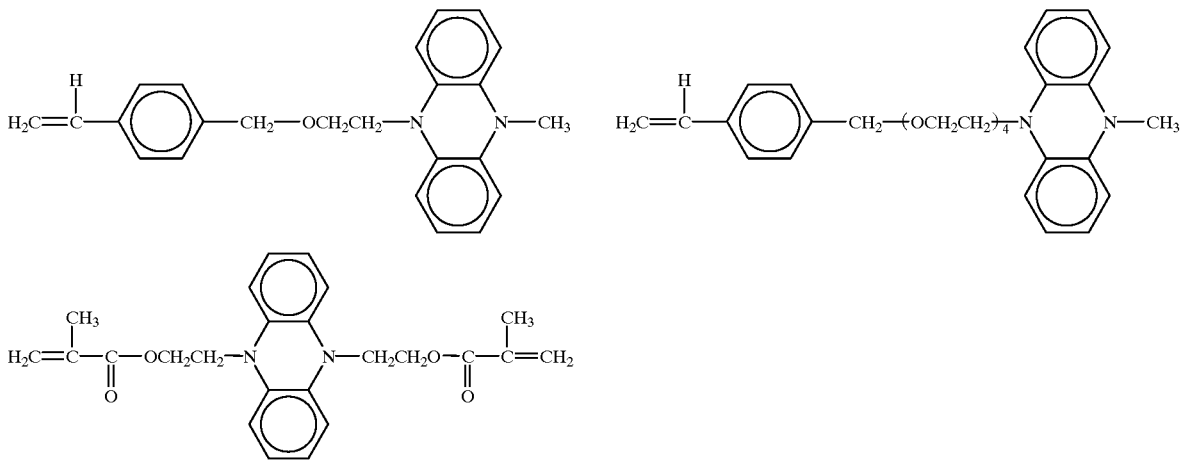

The ratio of Component (B) to a precursor of polymeric solid electrolyte hereinafter described is not particularly restricted but is usually 0.01 to 20 mass percent, preferably 0.1 to 10 mass percent.

The molar ratio of Component (A) to Component (B) is usually 10/1 to 1/20, preferably 2/1 to 1/3.

The term "precursor component of a polymeric solid electrolyte" (hereinafter referred to as Component (C)) denotes a component having fluidity which can be converted to a polymeric solid electrolyte by being cured. The polymeric solid electrolyte encompasses those which are substantially solid at room temperature and those which are gelatinized and thus exhibit almost no fluidity at room temperature. Despite that the polymeric solid electrolyte is solid or gel, the ion conductivity thereof is usually greater than $1 \times 10^{-7}$ S/cm, greater than $1 \times 10^{-6}$ S/cm, more preferably $1 \times 10^{-5}$ S/cm.

Component (C) is basically composed of a polymeric monomer and a supporting electrolyte and may further contain preferably a solvent and other components as required.

Eligible polymeric monomers are polyurethane monomers, acryloyle- or methacryloyle-modified polyalkyleneoxides, among which acryloyle- or methacryloyle-modified polyalkyleneoxides are preferred.

A polyurethane monomer having an acryloyle group or a methacryloyle group at both of the terminal ends is represented by the formula (10)

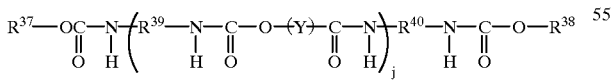

wherein $R^{37}$ and $R^{38}$ may be the same or different and are each independently a group of formula (11), (12) or (13), $R^{39}$ and $R^{40}$ may be the same or different and are each independently a divalent hydrocarbon group having 1 to 20, preferably 2 to 12 carbon atoms, Y is a polyether unit, a polyester unit, polycarbonate unit or a mixture thereof, j is an integer of 1 to 100, preferably 1 to 50, more preferably 1 to 20;

formula (11) being (11)

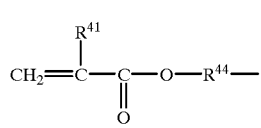

formula (12) being (12)

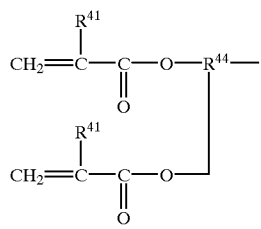

formula (13) being (13)

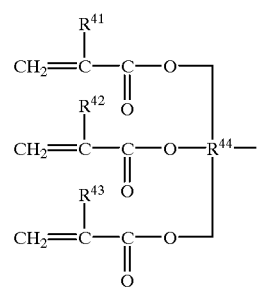

In formulae (11) to (13), $R^{41}$, $R^{42}$ and $R^{43}$ may be the same or different and are each independently hydrogen or a $C_1$–$C_3$ alkyl group, and $R^{44}$ is a divalent to quatervalent organic residue having 1 to 20, preferably 2 to 8 carbon atoms.

Specific examples of the organic residue are hydrocarbon residues such as alkyltoly groups, alkyltetratolyl groups and alkylene groups represented by the formula

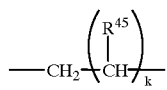
(14)

wherein $R^{45}$ is a $C_1$–$C_3$ alkyl group or hydrogen, k is an integer of 0 to 6 and if k is greater than 2, $R^{45}$ may be the same or different.

The hydrogen atoms in formula (14) may be partially substituted by an alkoxy group having 1 to 6, preferably 1 to 3 carbon atoms and an oxygen-containing hydrocarbon group such as a $C_6$–$C_{12}$ aryloxy group.

Specific examples of $R^{44}$ are methylene group, tetramethylene group and groups represented by the following;

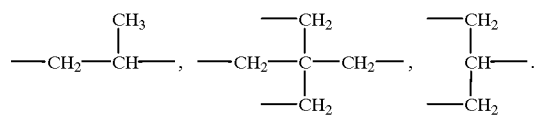

The divalent hydrocarbon group represented by $R^{39}$ and $R^{40}$ in formula (10) may be exemplified by aliphatic hydrocarbon groups, aromatic hydrocarbon groups and alicyclic hydrocarbon groups. The aliphatic hydrocarbon group may be an alkylene group represented by formula (14) above.

The divalent aromatic and alicyclic hydrocarbon groups may be exemplified by hydrocarbon groups represented by the following:

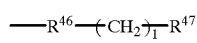
(15)

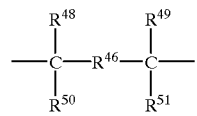
(16)

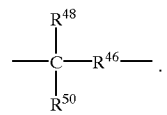
(17)

In formula (15) through (17), $R^{46}$ and $R^{47}$ may be the same or different and are each independently a phenylene group, a substituted phenylene group (alkyl-substituted phenylene group), a cycloalkylene group and a substituted cycloalkylene group (alkyl-substituted cycloalkylene group), and $R^{48}$, $R^{49}$, $R^{50}$ and $R^{51}$ may be the same or different and are each independently hydrogen or a $C_1$–$C_3$ alkyl group and l is an integer of 1 to 5.

Specific examples of $R^{39}$ and $R^{40}$ in formula (10) are the following divalent group:

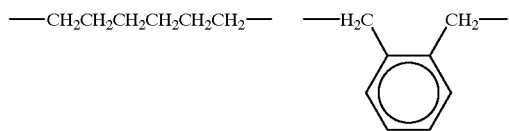

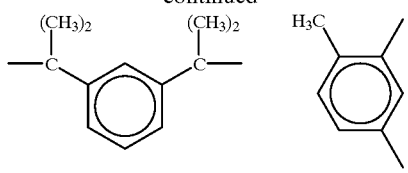

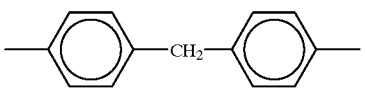

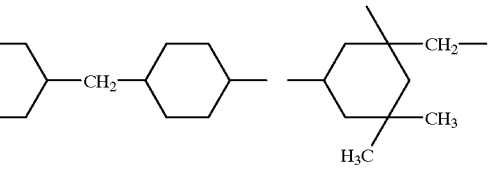

In formula (10), Y indicates a polyehter unit, a polyester unit, a polycarbonate unit or a mixed unit thereof. Each of these units is represented by the following:

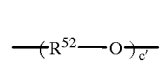
(c)

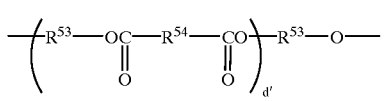
(d)

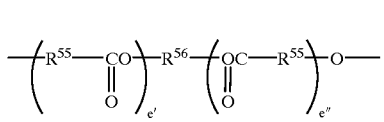
(e)

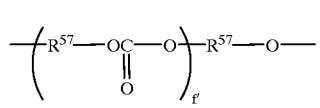
(f)

In formulae (c) through (d), $R^{52}$, $R^{53}$, $R^{54}$, $R^{55}$, $R^{56}$ and $R^{57}$ may be the same or different and are each independently a divalent hydrocarbon residue having 1 to 20, preferably 2 to 12 carbon atoms. $R^{52}$ through $R^{57}$ are each preferably a straight-chain or branched alkylene group. Specific examples for $R^{54}$ are methylene, ethylene, trimethylene, tetramethylene, pentamethylene, hexamethylene and propylene groups. Specific examples of $R^{52}$, $R^{53}$, $R^{55}$, $R^{56}$ and $R^{57}$ are ethylene and propylene groups. c' is an integer of 2 to 300, preferably 10 to 200. d' is an integer of 1 to 300, preferably 2 to 200. e' is an integer of 1 to 200, preferably 2 to 100. e" is an integer of 1 to 200, preferably 2 to 200. f' is an integer of 1 to 300, preferably 10 to 200.

In formulae (c) through (f), each of the units may be the same or different. In other words, if there exists a plurality of the groups of $R^{52}$ through $R^{57}$, the groups of each $R^{52}$ through $R^{57}$ may be the same or different.

The polyurethane monomer of formula (10) has a molecular-average molecular weight in the range of 2,500 to 30,000, preferably 3,000 to 20,000 and has preferably 2 to 6, more preferably 2 to 4 functional groups per molecule. The polyurethane monomer of formula (10) may be prepared by any suitable conventional method.

The other eligible polymeric monomers for Component (C) are acryloyl- or methacryloyl-modified polyalkylene oxides (hereinafter referred to as modified alkylene oxides). The polyalkylene oxide encompasses mono-, di- or polyfunctional modified polyalkylene oxides. These may be used singly or in combination. It is particularly preferred to use a monofunctional modified polyalkylene oxide as an essential component in combination with a difunctional modified polyalkylene oxide and/or a polyfunctional polyalkylene oxide. It is particularly preferred to use a mixture of a monofunctional modified polyalkylene oxide and a difunctional modified polyalkylene oxide. Although not restricted, the difunctional modified polyalkylene oxide and/or the polyfunctional polyalkylene oxide should be added in a total amount of 0.1 to 20, preferably 0.5 to 10 parts by weight of 100 parts by weight of the monofunctional modified polyalkylene oxide.

The monofunctional modified polyalkylene oxide is represented by the formula

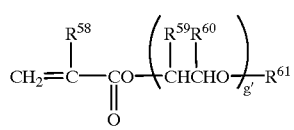

(18)

wherein $R^{58}$, $R^{59}$, $R^{60}$ and $R^{61}$ are each independently hydrogen or a $C_1$–$C_5$ alkyl group and g' is an integer of greater than 1.

In formula (18), $R^{58}$, $R^{59}$, $R^{60}$ and $R^{61}$ may be the same or different and are each independently hydrogen or a $C_1$–$C_5$ alkyl group. Specific examples of the alkyl group are methyl, ethyl, i-propyl, n-propyl, n-butyl, t-butyl and n-pentyl groups. It is preferred that $R^{58}$ is hydrogen or methyl group, $R^{59}$ is hydrogen or methyl group, $R^{60}$ is hydrogen or methyl group and $R^{61}$ is hydrogen, methyl or ethyl group. g' in formula (10) is an integer of greater than 1 and within the range of usually $1 \leq g' \leq 100$, preferably $2 \leq g' \leq 50$, more preferably $2 \leq g' \leq 30$.

Specific examples of the compound of formula (18) are those having 1 to 100, preferably 2 to 50, more preferably 2 to 20 of oxyalkylen units, such as methoxypolyethylene glcyol methacrylate, methoxypolypropylene glycol methacrylate, ethoxypolyethylene glycol methacrylate, ethoxypolypropylene glycol methacrylate, methoxypolyethylene glycol acrylate, methoxypolypropylene glycol acrylate, ethoxypolyethylene glycol acrylate, ethoxypolypropylene glycol acrylate and mixtures thereof.

If g' is greater than 2, the monofunctional modified polyalkylene oxide may be those having different oxyalkylene units, that is, copolymerized oxyalkylene units which may be alternating-, block- or random-polymerized and have 1 to 50, preferably 1 to 20 oxyethylene units and 1 to 50, preferably 1 to 20 oxypropylene unit. Specific examples of such copolymers are methoxypoly (ethylene.propylene) glycol methacrylate, ethoxypoly(ethylene.propylene)glycol methacrylate, methoxypoly(ethylene.propylene)glycol acrylate, ethoxypoly(ethylene.propylene)glycol acrylate and mixtures thereof.

The difunctional modified polyalkylene oxide is represented by the formula

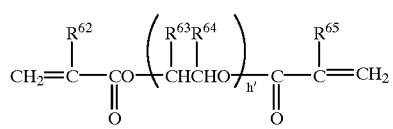

(19)

wherein $R^{62}$, $R^{63}$, $R^{64}$ and $R^{65}$ are each independently hydrogen or a $C_1$–$C_5$ alkyl group and h' is an integer of greater than 1.

The polyfunctional modified polyalkylene oxide having more than 3 functional groups is represented by the formula

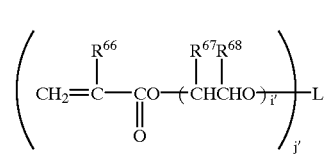

(20)

wherein $R^{66}$, $R^{67}$ and $R^{68}$ are each independently hydrogen or a $C_1$–$C_5$ alkyl group, i' is an integer of greater than 1, j' is an integer of 2 to 4 and L is a connecting group of valence indicated by q.

In formula (19), $R^{62}$, $R^{63}$, $R^{64}$ and $R^{65}$ may be the same or different and are each independently hydrogen or a $C_1$–$C_5$ alkyl group. Specific examples of the alkyl group are methyl, ethyl, i-propyl, n-propyl, n-butyl, t-butyl and n-pentyl groups. It is preferred that $R^{62}$ is hydrogen or methyl group, $R^{63}$ is hydrogen or methyl group, $R^{64}$ is hydrogen or methyl group and $R^{65}$ is hydrogen, methyl or ethyl group.

h' in formula (19) is an integer of greater than 1 and within the range of usually $1 \leq h' \leq 100$, preferably $2 \leq h' \leq 50$, more preferably $2 \leq h' \leq 30$.

Specific examples of the compound of formula (19) are those having 1 to 100, preferably 2 to 50, more preferably 2 to 20 of oxyalkylen units, such as polyethylene glycol dimethacrylate, polypropylene glycol dimethacrylate, polyethylene glycol methacrylate, polypropylene glycol dimethacrylate, and mixtures thereof.

If h' is greater than 2, the difunctional modified polyalkylene oxide may be those having different oxyalkylene units, that is, copolymerized oxyalkylene units which may be alternating-, block- or random-polymerized and have 1 to 50, preferably 1 to 20 oxyethylene units and 1 to 50, preferably 1 to 20 oxypropylene unit. Specific examples of such copolymers are poly(ethylene.propylene)glycol dimethacrylate, poly(ethylene.propylene)glycol diacrylate and mixtures thereof.

$R^{66}$, $R^{67}$ and $R^{68}$ in formula (20) are each independently hydrogen or a $C_1$–$C_5$ alkyl group. Specific examples of the alkyl group are methyl, ethyl, i-propyl, n-propyl, n-butyl, t-butyl and n-pentyl groups. $R^{66}$, $R^{67}$ and $R^{68}$ are each preferably hydrogen or methyl group.

i' in formula (20) is an integer of greater than 1 and within the range of usually $1 \leq i' \leq 100$, preferably $2 \leq i' \leq 50$, more preferably $2 \leq i' \leq 30$. j' denotes a number of connecting group "L" and is an integer of $2 \leq j' \leq 4$.

Connecting group "L" is a divalent, trivalent or quatravalent hydrocarbon group having 1 to 30, preferably 1 to 20 carbon atoms. The divalent hydrocarbon group may be alkylene, arylene, arylalkylene and alkylarylene groups and hydrocarbon groups having those groups as a base skeleton. Specific examples of the divalent hydrocarbon group are methylene group, ethylene group and a group represented by

(Bz respresent a benzene ring).

The trivalent hydrocarbon may be alkyltryl, aryltryl, arylalkyltryl, alkylaryltryl and hydrocarbon groups having those groups as the base skeleton. Specific examples of the trivalent hydrocarbon group are those represented by the following formulae:

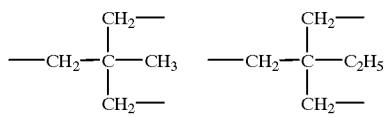

and

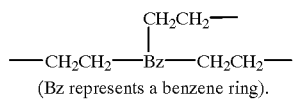

(Bz represents a benzene ring).

The quatravalent hydrocarbon may be alkyltetraaryl, aryltetraaryl, arylalkyltetraaryl and alkylaryltetraaryl groups and hydrocarbon groups having these groups as a base skeleton. Specific examples of the quatravalent hydrocarbon are those represented by

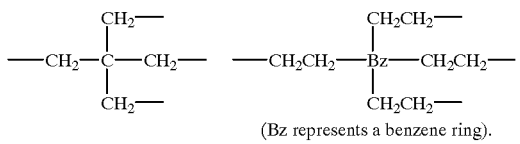

(Bz represents a benzene ring).

Specific examples of the compound of formula (20) are those having 1 to 100, preferably 2 to 50, more preferably 1 to 20 oxyalkylene units, such as trimethylolpropanetri(polyethylene glycol acrylate),
trimethylolpropanetri(polyethylene glycol methaacrylate),
trimethylolpropanetri(polypropylene glycol acrylate),
trimethylolpropanetri(polypropylene glycol methaacrylate),
tetramethylolmethanetetra(polyethylene glycol acrylate),
tetramethylolmethanetetra(polyethylene glycol methaacrylate),
tetramethylolmethanetetra(polypropylene glycol acrylate),
tetramethylolmethanetetra(polypropylene glycol methaacrylate),
2,2-bis[4-(acryloxypolyethoxy)phenyl]propane,
2,2-bis[4-(methaacryloxypolyethoxy)phenyl]propane,
2,2-bis[4-(acryloxypolyisopropoxy) phenyl]propane,
2,2-bis[4-(methaacryloxypolyisopropoxy)phenyl]propane and mixtures thereof.

If i' in formula (20) is greater than 2, the compound may be those having different oxyalkylene units from each other, that is, copolymerized oxyalkylene units which result from alternating-, block- or random-copolymerization. Specific examples of such compounds of formula (20) having 1–50, preferably 1–20 of oxyethylene units and 1–50, preferably 1–20 of oxypropylene units are trimethylolpropanetri(poly(ethylene.propylene) glycol acrylate), trimethylolpropanetri(poly(ethylene.propylene)glycol methaacrylate), tetramethylolmethanetetra(poly(ethylene.propylene)glycol acrylate), tetramethylolmethanetetra(poly(ethylene.propylene)glycol acrylate) and mixtures thereof.

There may be used the difunctional modified polyalkyleneoxide of formula (19) and the polyfunctional modified polyalkyleneoxide of formula (20) in combination. When these compounds are used in combination, the weight ratio of these compounds is within the range of 0.01/99.9–99.9/0.01, preferably 1/99–99/1, more preferably 20/80–80/20.

The other component of Component (C) is a supporting electrolyte which may be salts, acids and alkalis.

Salts may be inorganic ion salts such as alkali metal salts and alkaline earth metal salts, quaternary ammonium salts and cyclic quaternary ammonium salts. Specific examples of such salts are alkali metal salts of lithium, sodium or potassium, such as $LiClO_4$, LiSCN, $LiBF_4$, $LiAsF_6$, $LiCF_3SO_3$, $LiPF_6$, LiI, NaI, NaSCN, $NaClO_4$, $NaBF_4$, $NaAsF_6$, KSCN and KCl, quaternary ammonium salts such as $(CH_3)_4NBF_4$, $(C_2H_5)_4NBF_4$, $(n-C_4H_5)_4NBF_4$, $(C_2H_5)_4NBR$, $(C_2H_5)_4NClO_4$ and $(n-C_4H_9)_4NClO_4$ and mixtures thereof.

Acids may be inorganic acids or organic acids. Specific examples of the acids are sulfuric acid, hydrochloric acid, phosphoric acids, sulfonic acids and carboxylic acids.

Eligible alkalis are sodium hydroxide, potassium hydroxide and lithium hydroxide.

The precursor of a polymeric solid electrolyte referred to as Component (C) is preferably prepared by using a solvent in addition to the above-described polymeric monomer and supporting electrolyte.

Eligible solvents are organic polar solvents such as methanol, ethanol, propylene carbonate, ethylene carbonate, dimethylsulfoxide, dimethoxyethane, acetonitrile, r-butyrolactone, r-valerolactone, sulforan, dimethylformamide, dimethoxyethane, tetrahydrofuran, propionnitrile, glutaronitrile, adiponitrile, methoxyacetonitrile, dimethylacetoamide, methylpyrrolidinone, dimethylsulfoxide, dioxolane, trimethylphosphate and polyethylene glycol. Preferred are propylene carbonate, ethylene carbonate, dimethylsulfoxide, dimethoxyethane, acetonitrile, r-butyrolactone, sulforan, dioxolane, dimethylformamide, tetrahydrofuran, adiponitrile, methoxyacetonitrile, dimethylacetoamide, methylpyrrolidinone, dimethylsulfoxide, trimethylphosphate and polyethylene glycol. These organic polar solvents may be used singlely or in combination.

The solvent is added in an amount of 50 to 1,200, preferably 100 to 900, more preferably 200 to 500 parts by weight, per 100 parts by weight of the polymeric monomer. The supporting electrolyte is added in an amount of 0.1 to 30, 1 to 20 weight percent of the solvent.

When the polyurethane monomer of formula (10) is used, the solvent is used in an amount of 100 to 1,200 parts by weight, per 100 parts by weight of the polyurethane monomer. When the modified polyalkyleneoxide of formula (18), (19) or (20) is used, the solvent is used in amount of 50 to 800, preferably 100 to 500 parts by weight, per 100 parts by weight of the modified polyalkyleneoxide.

When the modified polyalkyleneoxide is used, the supporting electrolyte is used in an amount of 1 to 30, preferably 3 to 20 weight percent, of the total weight of the modified polyalkyleneoxide and the solvent.

If necessary, optional components may be added to Component (C) to an extent that the achievement of the purpose of the present invention is not hindered. Such optional components may be polymerization initiator such as photo polymerization initiators and thermal polymerization initiators, cross linking agents, polymers, gelatinizers and other polymeric solid electrolytes.

Eligible photo polymerization initiators are 1-(4-isopropylphenyl)-2-hydroxy-2-methylpropane-1-on. The photo polymerization initiator is used in an amount of 0.1 to 10, preferably 0.1 to 5 parts by weight, per 100 parts by weight of the polymeric monomer. The thermal polymerization initiator is used in an amount of 0.1 to 10, preferably 0.1 to 5 parts by weight, per 100 parts by weight of the polymeric monomer.

Eligible polymers are polyacrylonitrile, carboxymethyl cellulose, poly vinyl chloride, polyethylene oxide, polyurethane, polyacrylate, polymethacrylate, polyamide, polyacrylicamide, cellulose, polyester, polypropylene oxide and nafion.

Eligible gelatiners are oxyethylene methacrylate, oxyethylene acrylate, urethaneacrylate, acrylicamide and agar-agar.

Eligible polymeric solid electrolytes are polyethylene oxide, a polymer of oxyethylenemethacrylate, nafion, polystyrene sulfonate, $Li_3N$, $Na-\beta-Al_2O_3$, $Sn(HPO_4)_2 \cdot H_2O$. Particularly preferred are polymeric solid electrolyte obtained by polymerizing an oxyalkylene(metha)acrylate-based compound or a urethane acrylate-based compound.

The blend ratio between Components (A), (B) and (C) will be described hereinbelow.

Although the blend ratio of each component is arbitrary selected, the amount of Component (A) is preferably selected to an extent that the molar ratio of the polymeric monomer contained in Component (C) to Component (A) (the bipyridinium compound) is maintained to be 10,000/1 to 1/1, preferably 1,000/1 to 5/1, more preferably 100/1 to 1/1.

If the polymeric monomer in Component (C) is the polyfunctional polyalkylene oxide, the weight ratio of Component (A) to the polyfunctional polyalkylene oxide is within the range of 1/0.001 to 1/1, particularly preferably 1/0.05 to 1/0.5.

Component (B) is used in an amount of 1 to 500, preferably 5 to 200, more preferably 10 to 100 millimole.

The term "ultraviolet absorbing compound having an ethylenic double bond" used herein denotes an ultraviolet absorbing compound into which a group having an ethylenic double bond, typically an acryloyl group or a methacryloyl group is introduced (hereinafter referred to as Component (D)).

Although Component (D) is not an essential component of the present invention, the use of Component (D) can prevent the inventive device from deteriorating in electrochromic properties caused by ultraviolet rays.

Component (D) may be a compound having a benzotriazole skeleton represented by formula (21) or (22) or a benzophenon skeleton represented by formula (23) or (24):

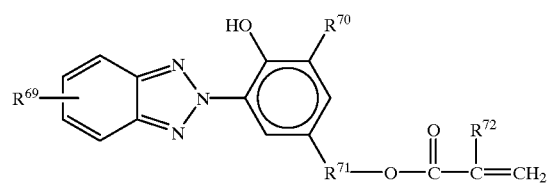
(21)

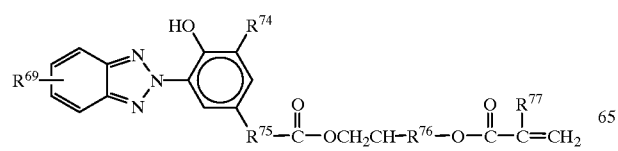
(22)

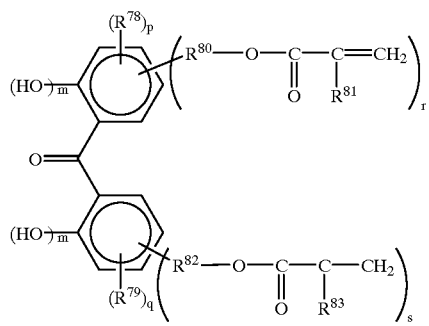
(23)

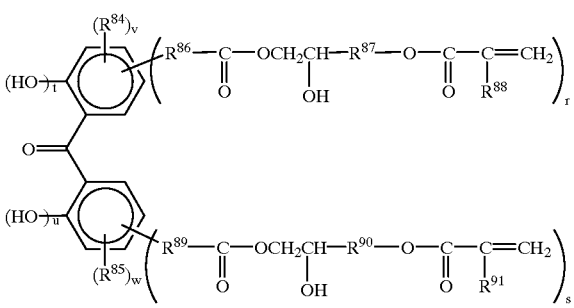
(24)

In formulae (21) through (24), $R^{69}$ and $R^{73}$ are each independently hydrogen, a halogen atom or an alkyl group having 1 to 10, preferably 1 to 6 carbon atoms. Specific examples of the halogen atom are fluorine, chlorine, bromine and iodine. Specific examples of the alkyl group are methyl, ethyl, propyl, i-propyl, butyl, t-butyl and cyclohexyl groups. $R^{65}$ and $R^{73}$ are usually substituted at the 4- or 5-position of the benzotriazole ring but the halogen atom and the alkyl group are usually located at the 4-position. $R^{70}$ and $R^{74}$ are hydrogen or an alkyl group having 1 to 10, preferably 1 to 6 carbon atoms. Specific examples of the alkyl group are methyl, ethyl, propyl, i-propyl, butyl, t-butyl and cyclohexyl groups. $R^{71}$, $R^{75}$, $R^{86}$ and $R^{89}$ are each independently a $C_1$–$C_{10}$ alkylene group such as ethylene and trimethylene groups. $R^{80}$ and $R^{82}$ each independently indicate a covalent bond or are a $C_1$–$C_{10}$ alkylene group such as ethylene and trimethylene groups. $R^{72}$, $R^{77}$, $R^{81}$, $R^{83}$, $R^{88}$ and $R^{91}$ are each independently hydrogen or methyl group. $R^{76}$, $R^{87}$ and $R^{90}$ are each independently a $C_1$–$C_{10}$ alkylene group such as methylene group. m, n, p, r, s, t, u, x and y are each an integer of 0 or 1 and satisfy the conditions of 1 $\leq$ m+n $\leq$ 2, 1 $\leq$ r+s $\leq$ 2, 1 $\leq$ t+u $\leq$ 2 and 1 $\leq$ x+y $\leq$ 2. p, q, v and w are each an integer of $0 \leq p \leq 3$, $0 \leq q \leq 3$, $0 \leq v \leq 3$ and $0 \leq w \leq 3$.

Specific examples of preferred compounds for Component (D) are as follows and two or more of these compounds may be used in combination:

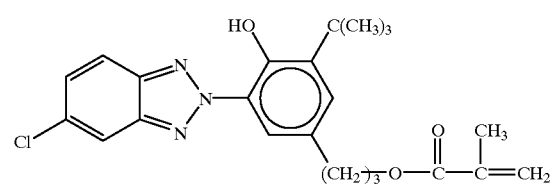

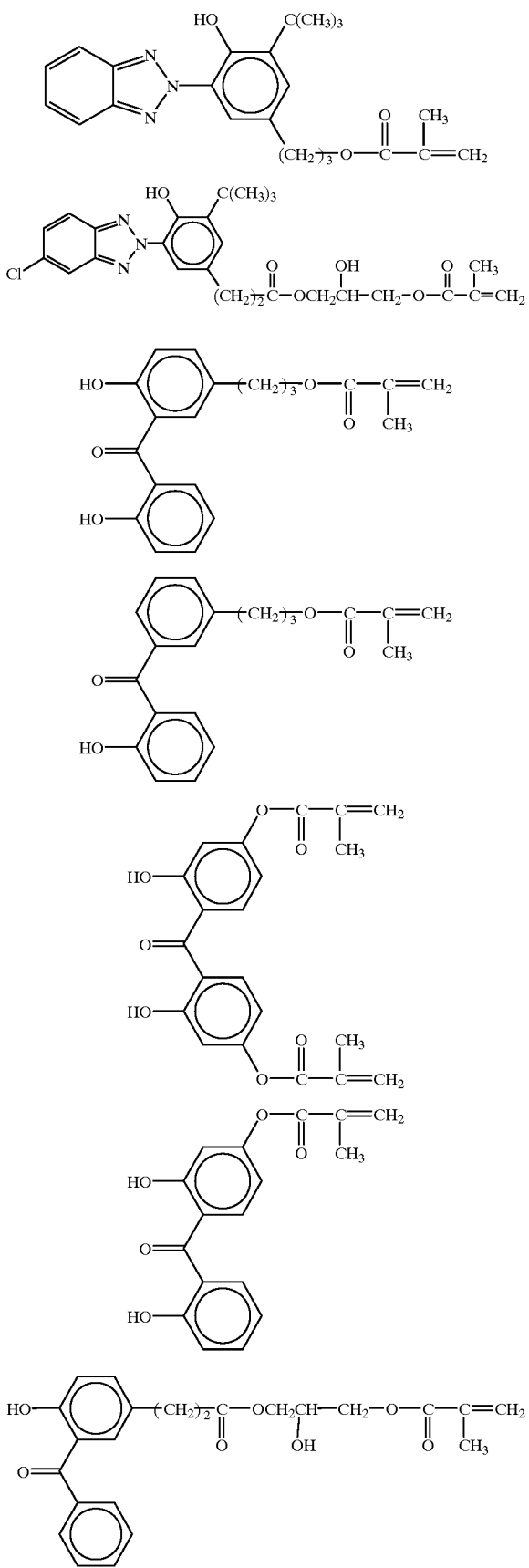

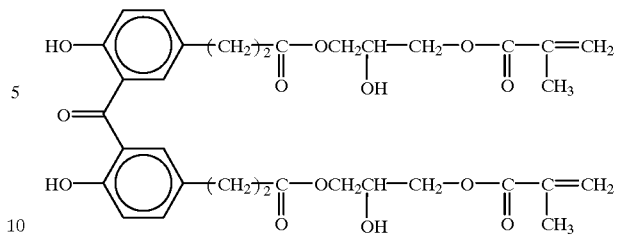

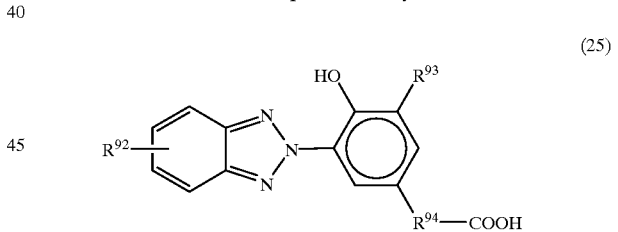

Component (D) is used in an amount of 1 to 500, preferably 5 to 200, more preferably 10 to 100 millimole, per mole of the polymeric monomer in Component (C).

Without using Component (D), it is possible to impart the inventive device with stability against ultraviolet rays by the following method:

(1) mixing a composition containing Components (A), (B) and (C) with an ultraviolet absorbing agent before curing the composition to form an ion conductive layer; and
(2) providing an ultraviolet absorbing layer at any site of the electrochromic device.

When method (1) is employed, the ultraviolet absorbing agent is used in an amount of 0.05 to 40, preferably 0.5 to 20 mass percent of Component (C).

In the case of employing method (2), the ultraviolet absorbing layer may be arranged in any location of the device. For instance, the ultraviolet absorbing layer may be arranged on the outermost surface of the device through which light passes through or between the substrate and the electrode located at the side of the device subjected to light. The ultraviolet absorbing layer may be formed by any suitable method. For instance, the ultraviolet absorbing layer may be formed by applying an ultraviolet absorbing agent dissolved in a solvent at a selected position and then distilling out the solvent. Eligible ultraviolet absorbing agents for methods (1) and (2) are compounds having a benzotriazole skeleton or a benzophenone skeleton.

Preferred examples of the compound having a benzotriazole skeleton are those represented by the formula (25)

In formula (25), $R^{92}$ is hydrogen, a halogen atom or an alkyl group having 1 to 10, preferably 1 to 6 carbon atoms. The halogen atom may be fluorine, chlorine, bromine and iodine. Specific examples of the alkyl group are methyl, ethyl, propyl, i-propyl, butyl, t-butyl and cyclohexyl groups. $R^{92}$ is substituted at the 4- or 5-position of the benzotriazole skeleton but the halogen atom or the alkyl group are usually located at the 4-position. $R^{93}$ is hydrogen or an alkyl group having 1 to 10, preferably 1 to 6. Specific examples of the alkyl group are methyl, ethyl, propyl, i-propyl, butyl, t-butyl and cyclohexyl groups. $R^{94}$ is an alkylene group having 1 to 10, preferably 1 to 3 carbon atoms or an alkylidene having 1 to 10, preferably 1 to 3 carbon atoms. Specific examples of the alkylene group are methylene, ethylene, trimethylene and propylene. Specific examples of the alkylidene are ethylidene and propylidene.

Specific examples of the compound of formula (25) are 3-(5-chloro-2H-benzotriazole-2-yl)-5-(1,1-dimethylethyl)-

4-hydroxy-benzene propanoic acid, 3-(2H-benzotriazole-2-yl)-5-(1,1-dimethylethyl)-4-hydroxy-benzene ethanoic acid, 3-(2H-benzptriazole-2-yl)-4-hydroxybenzene ethanoic acid and 3-(5-methyl-2H-benzotriazole-2-yl)-5-(1-methylethyl)-4-hydroxybenzene propanoic acid.

Preferred examples of the compound having a benzophenone skeleteton are those represented by the formula

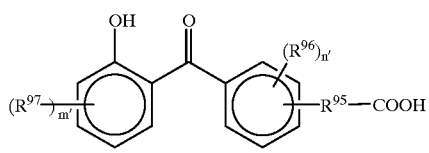

(26)

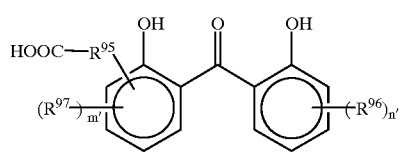

(27)

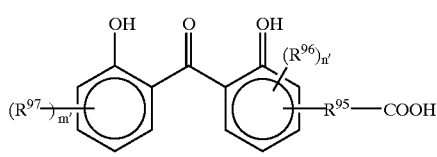

(28)

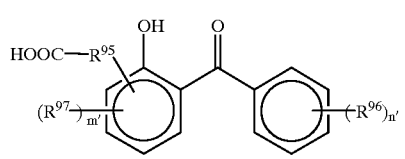

(29)

In the above formulae, $R^{96}$ and $R^{97}$ may be the same or different and are each independently a hydroxyl group, an alkyl or alkoxy group having 1 to 10, preferably 1 to 6 carbon atoms. m' and n' are an integer of $0 \leq m' \leq 3$ and $0 \leq n' \leq 3$. Specific examples of the alkyl group are methyl, ethyl, propyl, i-propyl, butyl, t-butyl and cyclohexyl groups. Specific examples of the alkoxy group are methoxy, ethoxy, propoxy, i-propoxy and butoxy groups. $R^{96}$ is an alkylene group having 1 to 10, preferably 1 to 3 carbon atoms or an alkylidene having 1 to 10, preferably 1 to 3 carbon atoms. Specific examples of the alkylene group are methylene, ethylene, trimethylene and propylene. Specific examples of the alkylidene are ethylidene and propylidene.

Specific examples of the compound having a benzophenone skeleton are 2-hydroxy-4-methoxybenzophenone-5-carboxylic acid, 2,2'-dihydroxy-4-methoxybenzophenone-5-carboxylic acid and 4-(2-hydroxybenzoyl)-3-hydroxybenzene propanoic acid.

The electrochromic device according to the present invention comprises a pair of electrically conductive substrates and an ion conductive layer disposed therebetween which layer is obtained by curing a composition containing Components (A) through (C) and Component (D) if necessary. The term "curing" used herein denotes an increase in viscosity brought by chemical reaction. Such chemical reaction may be thermal- or photo-polymerization, polycondensation and cross linking, among which thermal- or photo-polymerization is preferred.

In the case of photo polymerization, a photo polymerization initiator is preferably added to Component (C). The type and source of light are not particularly restricted. Preferred types of light are far ultraviolet rays, ultraviolet rays and visible rays. Preferred light sources are high voltage mercury lumps, fluorescent lights and xenon lumps. Although not restricted, the photo polymerization is conducted by irradiating light at 100 to 50,000, preferably 1,000 to 20,000 mJ/cm$^2$.

In the case of thermal polymerization, a thermal polymerization initiator is preferably added to Component (C). Although not restricted, thermal polymerization is conducted at a temperature of 0 to 130° C., 20 to 80° C. and for 10 minutes to 100 hours, preferably 30 minutes to 40 hours.

The progress of the reaction can be observed by detecting a decrease in double bond with IR or NMR.

Although not restricted, the resulting ion conductive layer has preferably an ion conductivity of greater than $1 \times 10^{-7}$, preferably greater than $1 \times 10^{-6}$, more preferably greater than $1 \times 10^{-7}$ S/cm, at room temperature. Although not restricted, the ion conductive layer has a thickness of $1\mu$ to 3 mm, preferably $10\mu$ to 1 mm.

The ion conductive layer may be formed by any suitable known method. For instance, the ion conductive layer may be formed by curing a composition containing Components (A) through (C) or (A) through (D) alternatively with optional components after being injected into a space between two electrically conductive substrates disposed in opposed relation and having sealed peripheral edges, by vacuum injection or atmospheric injection or a meniscus method. Alternatively, after the ion conductive layer is formed over the electrode of one electrically conductive substrate, this substrate is assembled with the other electrically conductive substrate.

The electrochromic device according to the present invention is characterized by having two electrically conductive substrates at least one of which is transparent and an ion conductive material layer disposed therebetween. The basic structure of the device will be described hereinbelow with reference to the annexed drawings.

FIG. 1 shows a device 10 composed of a transparent electrically conductive substrate 11 having a transparent substrate 12 and a transparent electrode layer 13 laminated thereover, an opaque, transparent or reflective electrically conductive substrate 14 having a transparent or opaque substrate 17 and a transparent, opaque or reflective electrode layer 16 disposed thereover and an ion conductive material layer 14 disposed between the electrically conductive substrates 11, 17.

Figure 2:
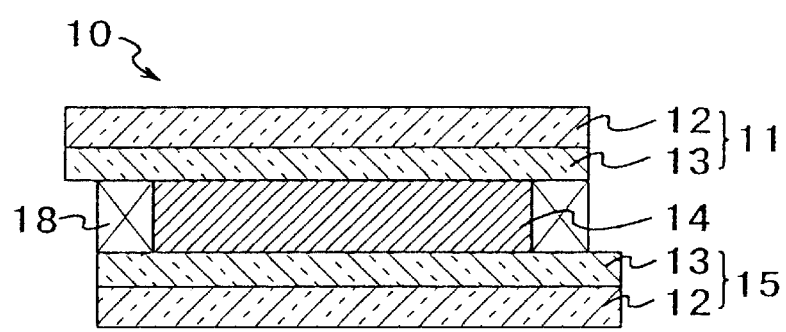
FIG. 2 is a cross-sectional view showing the structure of an electrochromic smart window glass according to the present invention.

FIG. 2 shows the structure of an display device or a smart window 10 in which an ion conductive material layer 14 is disposed between two transparent electrically conductive substrates 11, 15 each of which has a transparent substrate 12 and a transparent electrode layer 13 formed over one surface of each the substrate 11, and which are placed at a certain interval so that the transparent electrode layers face each other.

Figure 3:
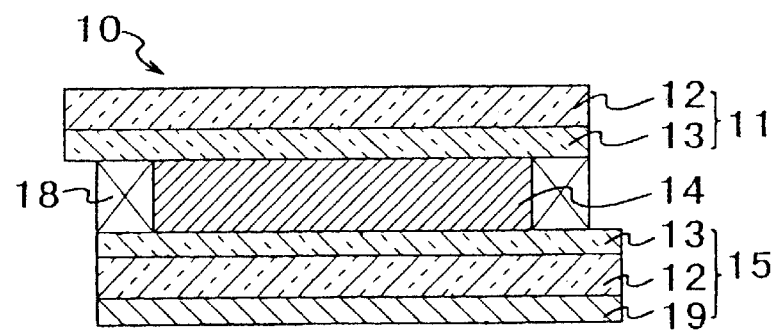
FIG. 3 is a cross-sectional view showing the structure of an electrochromic mirror according to the present invention.

FIG. 3 show the structure of an electrochromic mirror 10 in which an ion conductive material layer 14 is disposed between a transparent electrically conductive substrate 11 having a transparent substrate 12 over one of which surface a transparent electrode layer 13 is formed and a reflective electrically conductive substrate 15 having a transparent substrate 12 over one surface of which a transparent electrode layer 13 is formed and over the other surface of which a reflective layer 19 is formed, the electrically conductive substrates being placed at a certain interval so that the transparent electrode layers face each other.

The layers forming the device according to the present invention may be prepared by following the above-described methods. For instance, in the case of the device shown in FIG. 1, Laminate (A) is obtained by forming a transparent electrode layer 13 over a transparent substrate 12 in the foregoing manner and apart from this Laminate (B) is obtained by a transparent, opaque or reflective electrode layer 16 over a substrate 17. Consequently, Laminates (A) and (B) are placed in a opposing relation to each other with a space of 1 to 1,000 μm and then the peripheral edges except a portion for injecting an ion conductive material are sealed with a sealant 18 thereby producing a hallow cell with an injection port. After injecting a composition containing Components (A) through (C) and Component (D) added as required into the cell thorough the injecting port, an ion conductive material layer 16 is formed by curing the composition thereby producing a device 10.

A spacer may be used in order to keep the space between Laminates (A) and (B) constant upon placing them in an opposing relation. The spacer may be in the form of beads or sheet formed from glass or polymer. The spacer may be provided by inserting the beads or sheet into the space of the substrates facing each other or by forming protrusions formed from an insulate material such as a resin, over the electrode of the electrically conductive substrate.

Although no particular limitation is imposed on a method of curing a composition containing Components (A) through (C) or Components (A) through (D), the composition may be cured by light or heat or by mixing a reactive liquid curing with a lapse of time with the composition immediately before injecting the same. The injection port may be sealed in any suitable manner.

Alternatively, Laminate (A') is obtained by forming a transparent electrode layer 13 and an ion conductive material layer 14 in this order over a transparent substrate 12 in the aforesaid manner and apart from this Laminate (B') is obtained by forming an opaque or transparent reflective electrode layer 16 over a substrate 17 in the aforesaid manner. Consequently, Laminates (A') and (B') are placed in an opposing relation with a space of 1 to 1,000 μm so that the ion conductive material layer 14 is contacted with the reflective electrode layer, followed by sealing the peripheral edges with a sealant 18.

In the case of the electrochromic dimmer glass shown in FIG. 2, after two transparent electrically conductive substrates 11, 15 are each prepared by forming a transparent electrode layer 13 over one surface of a transparent substrate 12, the dimmer glass is produced by following the procedure as described with respect to the device of FIG. 1. In the case of the electrochromic mirror shown in FIG. 3, after preparing a transparent electrically conductive substrate by forming a transparent electrode layer 13 over one surface of a transparent substrate 12 and a reflective electrically conductive substrate by forming a transparent electrode layer 13 over one surface of a transparent substrate 12 and a reflective layer 19 over the other surface of the same, the electrochromic mirror is produced by following the procedure as described with respect to the device of FIG. 1.

The typical examples of structures of the devices according to the present invention are as shown in FIGS. 1 to 3. However, the present invention is not restricted to these particular embodiments and thus may further contain other components. Such components are exemplified by an ultraviolet shielding layer such as an ultraviolet reflective layer and an ultraviolet shielding layer and an overcoat layer for protecting the whole mirror layer or each layer of an electrochromic mirror. Such an ultraviolet shielding layer may be arranged the out side or the transparent electrode layer side of a transparent substrate 12. Such an overcoat layer may be arranged over the outer side of an transparent substrate 12 or a reflective layer 19.

The device according to the present invention is useful as display devices, smart windows, anti-glare mirrors fro automobiles or decorative mirrors for indoor use.

The examples which follow are intended as an illustration of certain preferred embodiments of the present invention, and no limitation of the invention is implied.

EXAMPLE 1

(1) Synthesis of Bipyridinume Compound

Bipyridine was reacted with an equimolar amount of benzylchloride in acetone thereby obtaining N-benzylbipyridiniumchloride. 5.94 g (21 mmol) of the N-benzylbipyridiniumchloride thus obtained were dissolved in 150 ml of 2-propanol and then 3.21 g (21 mmol) of chloromethyl styrene (m- and p-isomers mixture) were added thereto, followed by 24-hour stirring at room temperature thereby obtaining N-benzyl-N'-vinylbenzylbipyridinium chloride represented by the formula

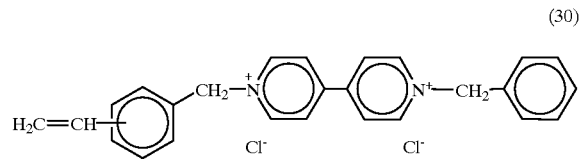

(30)

(2) Synthesis of Amine Compound 25.4 g (150 mmol) of diphenylamine and 22.8 g (150 mmol) of cesium fluoride were weighed into a 500 ml three-necked flask. After substituting the flask with nitrogen, 250 ml of dimethylsulfoxide was added to the mixture and then stirred. 21.3 g (150 mmol) of 1-fluoro-4-nitrobenzene was then added to the mixture and heated at a temperature of 120° C. in an oil bath, followed by 24-hour stirring.

The resulting reaction solution was poured into ice-cold water to be precipitated. The solid thus obtained was recrystallized from acetic acid thereby obtaining 29.5 g (102 mmol) of a compound represented by the formula

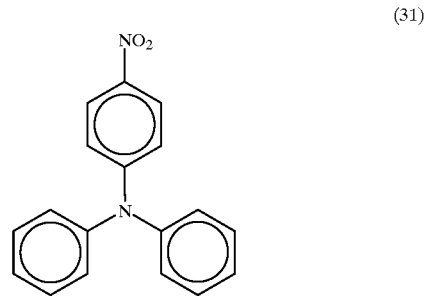

(31)

15.0 g (52 mmol) of the compound of formula (31) were transferred to a 500 ml three-necked flask and supplied with hydrogen at atmospheric pressure after adding 200 ml of dimethylformamide and 1.5 g of 5% palladium/carbon mixture. After 12-hour stirring at room temperature, the palladium carbon was filtered out and then the reaction solution was poured into ice-cold water to be precipitated.

A white solid substance was vacuum-dried thereby obtaining 12.5 g (48 mmol) compound represented by the formula (32)

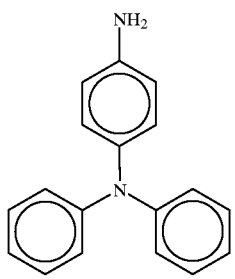

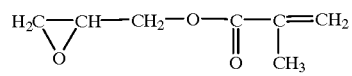
(35)

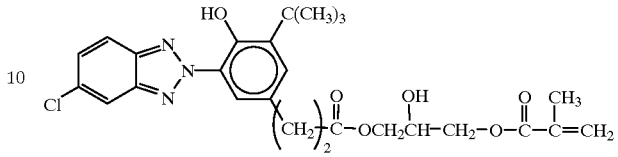
(36)

12.5 g (48 mmol) of the compound of formula (32) were transferred to a 500 ml three-necked flask and then stirred under ice cooling after adding dropwise a 20 ml solution of 6.3 g of chloride methacrylate and benzene.

The reaction solution was washed with a 1NHCl aqueous solution, water and a 1NNaOh aqueous solution, twice respectively and dried over sodium sulfate. The solvent was removed thereby obtaining 13.4 g (41 mmol) compound represented by the formula (33)

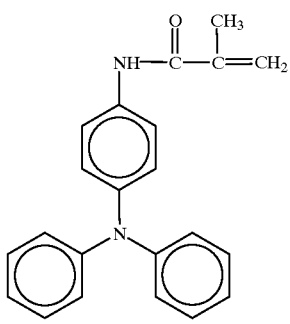

(3) Synthesis of Ultraviolet Absorbing Compound Having an Ethylenic Double Bond

To a 300 ml three-necked flask was charged with 18.3 g (49 mmol) compound of formula (34) shown below, 60 ml of diglyme (diethylene glycol dimethyl ether) and 0.9 g (7 mmol) of dimethylbenzylamine. A solution obtained by dissolving 7.7 g (54 mmol) of glycidyl methacrylate in 20 ml diglyme was added dropwise to the mixture and then reacted by heating for 13 hours. Even after cooling the resulting solution, it is observed that the solution had no insoluble substance and was transparent.

The solution was poured into methanol to be precipitated. The solid substance thus obtained was vacuum-dried thereby obtaining 18.9 g (37 mmol) of a compound represented by formula (36) shown in below.

(34)

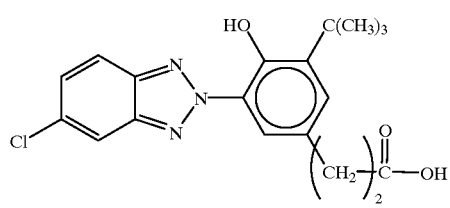

(4) Production of Electrochromic Mirror

A laminate was prepared by forming a thin film of palladium as a highly reflective electrode, over a substrate. An epoxy sealant was applied in the form of lines along the peripheral edges, except for a portion to be used for injecting a electrolyte precursor solution, of the palladium film layer of the laminate. A transparent glass substrate coated with $SnO_2$ was superposed over the laminate such that the $SnO_2$ surface and the palladium film layer face each other and then the epoxy sealant was cured with pressurizing thereby producing a hallow cell with an injection port.

On the other hand, a homogenous solution was obtained by adding 0.4 g of lithium perchlorate to 4.0 g of a mixed solution of 1.0 g of methoxypolyethylene glycol monomethacrylate (the number of oxyethylene unit: 4) manufactured by SHIN NAKAMURA CHEMICAL CO. LTD. under the trade name of ME04, 0.02 g of polyethylene glycol dimethacrylate (the number of oxyethylene unit: 9) manufactured by SHIN NAKAMURA CHEMICAL CO. LTD. under the trade name of 9G and 4.0 g of γ-butylolactone. To the homogenous solution was added 0.02 g of a photopolymerization initiator, 1-(4-isopropylephenyl)-2-hydroxy-2-methylpropane-1-on manufactured by MELK CO., LTD. under the trade name of "Diecure-1116" in a dark room and further added 0.85 g (1.84 mmol) of N-benzyl-N'-vinylbenzylbipyridinium chloride obtained in the above procedure (1), 0.60 g (1.84 mmol) of the amine compound of formula (33) and 0.95 g (1.84 mmol) of the ultraviolet absorbing compound having an ethylenic double bond of formula (36). The resulting homogenous solution was injected into the cell obtained above after being dehydrated.

After the injection port was sealed with an epoxy sealant, the solution in the cell was cured by exposing the side of the transparent substrate of the cell to fluorescent light thereby obtaining an electrochromic polymeric solid electrolyte and also an all solid type electrochromic mirror of the structure as shown in FIG. 3.

The mirror when assembled was not colored and had a reflectance of about 80%. The mirror was quick in response to an electric voltage and exhibited excellent electrochromic properties. The mirror was colored upon application of a voltage of 1.2 V and had a reflectance of 10%. Coloring and bleaching operations were repeated every 10 seconds, but no remnant coloration was observed after the lapse of about 200 hours.

When the electrochromic mirror was broken, no medium scattered and flowed out.

50 $mJ/cm^2$ of xenon light was irradiated to the electrochromic mirror when it was colored by applying a voltage of 1.2 V. After terminating the application of the voltage, the reflectance of the mirror was recovered from 10% to 80%. As a result of this, the electrochromic device using the polymeric solid electrolyte according to the present invention is superior in resistance to deterioration against ultraviolet rays.

EXAMPLE 2

(1) Synthesis of Bipyridinium Compound 3.12 g (20 mmol) of bipyridyl was dissolved in 100 ml of acetonitrile in a flask, followed by addition of 6.10 g (40 mmol) of chloromethyl styrene (m- and p-isomers mixture) and 50 mg (0.45 mmol) of an polymerization prohibitor, hydroquinone.

After stirring the mixture at room temperature for 24 hours, the solid substance was filtered and dried thereby obtaining 7.84 g (17 mmol) of N,N'-di-vinylbenzylbipyridinium dichloride represented by the formula

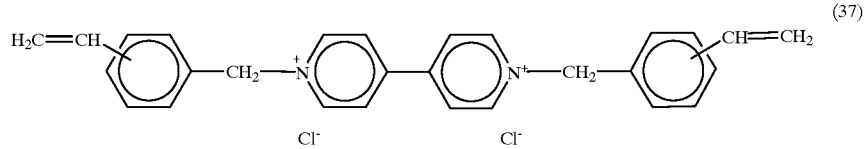

(37)

(2) Production of Electrochromic Smart Window

An electrically conductive substrate was prepared by coating the surface of a transparent glass substrate with ITO. An epoxy sealant was applied in the form of lines along the peripheral edges, except for a portion to be used for injecting an electrolyte precursor solution, of the ITO layer of the substrate. A transparent glass substrate coated with platinum was superposed over the ITO coated substrate such that the ITO surface and the platinum surface face each other and then the epoxy sealant was cured with pressurizing thereby producing a hallow cell with an injection port.

On the other hand, a homogenous solution was obtained by adding 0.4 g of lithium perchlorate to 4.0 g of a mixed solution of 1.0 g of methoxypolyethylene glycol monomethacrylate (the number of oxyethylene unit: 4) manufactured by SHIN NAKAMURA CHEMICAL CO. LTD. under the trade name of M40GN, 0.02 g of polyethylene glycol dimethacrylate (the number of oxyethylene unit: 9) manufactured by SHIN NAKAMURA CHEMICAL CO. LTD. under the trade name of 9G and 4.0 g of γ-butylolactone. To the homogenous solution was added 0.02 g of a photopolymerization initiator, 1-(4-isopropylephenyl)-2-hydroxy-2-methylpropane-1-on manufactured by MELK CO., LTD. under the trade name of "Diecure-1116" in a dark room and further added 0.85 g (1.84 mmol) of N,N'-di-vinylbenzylbipyridinium dichloride of formula (39) obtained the above procedure (1), 0.60 g (1.84 mmol) of the amine compound of formula (33) in Example 1 and 1.20 g (2.33 mmol) of the ultraviolet absorbing compound having an ethylenic double bond of formula (36) in Example 1. The resulting homogenous solution was injected into the cell obtained above after being dehydrated.

After the injection port was sealed with an epoxy sealant, the solution in the cell was cured by exposing both the surfaces of the cell to fluorescent light thereby obtaining an electrochromic polymeric solid electrolyte and also an all solid type electrochromic smart window as shown in FIG. 1.

The smart window when assembled was not colored and had a reflectance of about 90%. The mirror was quick in response to an electric voltage and exhibited excellent electrochromic properties. The mirror was colored upon application of a voltage of 1.2 V and had 10% transmittance of 633 nm wavelength light. Coloring and bleaching operations were repeated every 10 seconds, but no remnant coloration was observed after the lapse of about 200 hours.

When the electrochromic smart window was broken, no medium sandwiched between the substrates scattered and flowed out.

50 mJ/cm² of xenon light was irradiated to the electrochromic mirror when it was colored by applying a voltage of 1.2 V. After terminating the application of the voltage, the reflectance of the smart window was recovered from 20% to 90%. As a result of this, it is apparent that the electrochromic device using the polymeric solid electrolyte according to the present invention is superior in resistance to deterioration against ultraviolet rays.

EXAMPLE 3

(1) Synthesis of Bipyridinium Compound

N-benzyl-N'-vinylbenzylbipyridinium chloride was recovered from a mixed solution of water-IPA containing HBF4 so as to be anion-exchanged thereby obtaining N-benzyl-N'-vinylbenzylbipyridinium-di(tetrafluoroborate) represented by the formula

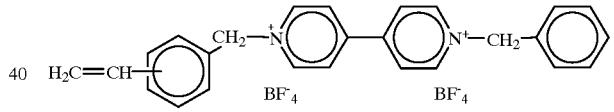

(38)

(2) Synthesis of Amine Compound

To 10.0 g (39.9 mmol) of dihydro-di-(2-hydroxyethyl) phenazine represented by formula (39) below dissolved in 30 ml of methylene chloride was added dropwise a solution of 6.3 g (60 mmol) chloride methacrylate/15 ml methylene chloride. After stirring at room temperature for 5 hours, the solution was washed with aqueous solution containing dilute sodium chloride, dilute hydrochloric acid and dilute sodium hydrogencarbonate, respectively and dried over NaSO₄. The methylene chloride was distilled off thereby obtaining 11.9 g (29.3 mmol) of a compound represented by formula (40):

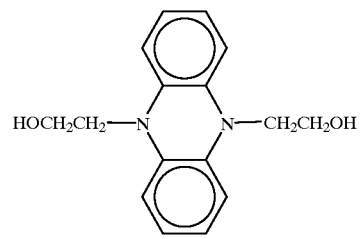

(39)

(40)

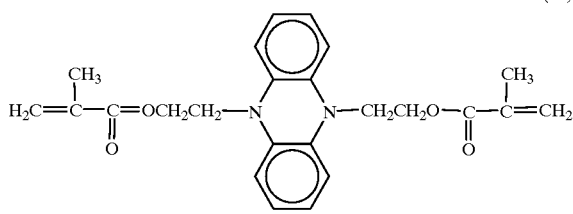

(3) Production of Electrochromic Mirror

A laminate was prepared by forming a thin film of palladium as a highly reflective electrode, over a substrate. An epoxy sealant was applied in the form of lines along the peripheral edges, except for a portion to be used for injecting an electrolyte precursor solution, of the palladium film layer of the laminate. A transparent glass substrate coated with ITO was superposed over the laminate such that the ITO surface and the palladium film layer face each other and then the epoxy sealant was cured with pressurizing thereby producing a hallow cell with an injection port.

On the other hand, a homogenous solution was obtained by adding 0.4 g of lithium perchlorate to 4.0 g of a mixed solution of 1.0 g of methoxypolyethylene glycol monomethacrylate (the number of oxyethylene unit: 4) manufactured by SHIN NAKAMURA CHEMICAL CO. LTD. under the trade name of M40GN, 0.02 g of polyethylene glycol dimethacrylate (the number of oxyethylene unit: 9) manufactured by SHIN NAKAMURA CHEMICAL CO. LTD. under the trade name of 9G and 4.0 g of γ-butylolactone. To the homogenous solution was added 0.02 g of a photopolymerization initiator, 1-(4-isopropylephenyl)-2-hydroxy-2-methylpropane-1-on manufactured by MELK CO., LTD. under the trade name of "Diecure-1116" in a dark room and further added 0.87 g (1.85 mmol) of N-benzyl-N'-vinylbenzylbipyridinium-di (tetrafluoroborate) obtained in the above procedure (1), 0.75 g (1.85 mmol) of the amine compound of formula (40) and 0.95 g (1.84 mmol) of the ultraviolet absorbing compound having an ethylenic double bond of formula (36). The resulting homogenous solution was injected into the cell obtained above after being dehydrated.

After the injection port was sealed with an epoxy sealant, the solution in the cell was cured by exposing the side of the transparent substrate of the cell to fluorescent light thereby obtaining an electrochromic polymeric solid electrolyte and also an all solid type electrochromic mirror of the structure as shown in FIG. 3.

The mirror when assembled was not colored and had a reflectance of about 80%. The mirror was quick in response to an electric voltage and exhibited excellent electrochromic properties. The mirror was colored upon application of a voltage of 1.0 V and had a reflectance of about 8%. Coloring and bleaching operations were repeated every 10 seconds, but no remnant coloration was observed after the lapse of about 200 hours.

When the electrochromic mirror was broken, no medium sandwiched between the substrates scattered and flowed out.

50 mJ/cm² of xenon light was irradiated to the electrochromic mirror when it was colored by applying a voltage of 1.2 V. When the application of the voltage was terminated, the reflectance of the mirror was recovered from 8% to 80% after 10 seconds passed. As a result of this, the electrochromic device using the polymeric solid electrolyte according to the present invention is superior in resistance to deterioration against ultraviolet rays.

Comparative Example 1

A laminate was prepared by forming a thin film of palladium as a highly reflective electrode, over a substrate. An epoxy sealant was applied in the form of lines along the peripheral edges, except a portion to be used for injecting a electrolyte precursor solution, of the palladium film layer of the laminate. A transparent glass substrate coated with $SnO_2$, was superposed over the laminate such that the $SnO_2$ surface and the palladium film layer face each other and then the epoxy sealant was cured with pressurizing thereby producing a hallow cell with an injection port.

On the other hand, a homogenous solution was prepared by adding 0.4 g of lithium perchlorate to 4.0 g of propylene carbonate. To the homogenous solution were added 0.95 g (1.84 mmol) of N,N'-diheptylbipyridinium bromide and N,N,N',N'-tetramethylphenylenediamine. The resulting homogenous solution was injected into the cell through the port after being dehydrated.

The mirror when assembled was not colored and had a reflectance of about 80%. The mirror was quick in response to an electric voltage and exhibited excellent electrochromic properties. The mirror was colored upon application of a voltage of 1.0 V and had a reflectance of about 10%. However, after coloring and bleaching operations were repeated every 10 seconds, blue remnant coloration around the sealant was observed after the elapse of about 200 hours, which remnant was believed to result from dimerization of viologen.

When the electrochromic mirror was broken, the medium sandwiched between the substrates scattered.

The electrochromic device is superior in capabilities of avoiding the viologen from precipitation caused by dimerization thereof and resulting in the deterioration of the viologen and electron donative compounds and the medium from scattering. Furthermore, the electrochromic device according to the present invention can avoid the viologen and electron donative compounds from deterioration caused by being exposed to ultraviolet rays, by using an ultraviolet absorbing compound.

What is claimed is:

1. An electrochromic device which has an ion conductive layer obtained by curing a composition comprising (a) a bipyridinium compound represented by formula (1), (b) an amine compound represented by formula (2) and/or (3) and (c) a precursor component of a polymeric solid electrolyte, disposed between two electrically conductive substrates at least one of which is transparent, said formula (1) being (1)

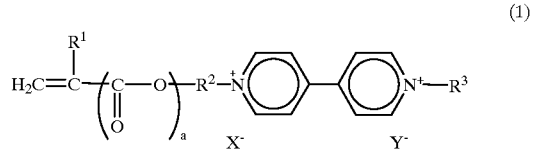

wherein X— and Y— are the same or different and are each independently a counter anion selected from the group consisting of an halogen anion, $ClO_4$—, $BF_4$—, $PF_6$—, $CH_3COO$— and $CH_3(C_6H_4)SO_3$—, $R^1$ is hydrogen or a $C_1$–$C_5$ alkyl group, $R^2$ is a $C_1$–$C_{30}$ divalent hydrocarbon or oxygen-containing hydrocarbon group, $R^3$ is a $C_1$–$C_{20}$ hydrocarbon or oxygen-containing hydrocarbon group and a is an integer of 0 or 1; said formula (2) being (2)

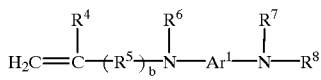

wherein $R^4$ is hydrogen or a $C_1$–$C_5$ alkyl group, $R^5$ is a $C_1$–$C_{15}$ hydrocarbon or oxygen-containing hydrocarbon group, b is an integer of 0 or 1, $R^6$ and $R^7$ are the same or different and are each independently hydrogen or a $C_1$–$C_{20}$ hydrocarbon or oxygen-containing hydrocarbon group, $R^8$ is hydrogen or a $C_1$–$C_{20}$ hydrocarbon or oxygen-containing hydrocarbon group and $Ar^1$ is a $C_6$–$C_{20}$ divalent aromatic hydrocarbon group; and said formula (3) being (3)

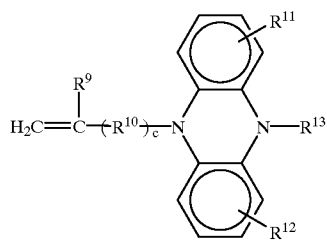

wherein $R^9$ is hydrogen or a $C_1$–$C_5$ alkyl group, $R^{10}$ is a $C_1$–$C_{15}$ hydrocarbon or oxygen-containing hydrocarbon group, c is an integer of 0 or 1, $R^{11}$ and $R^{12}$ are the same or different and are each independently hydrogen or a $C_1$–$C_{20}$ hydrocarbon or oxygen-containing hydrocarbon group and $R^{13}$ is hydrogen or a $C_1$–$C_{20}$ hydrocarbon or oxygen-containing hydrocarbon group.

2. The electrochromic device according to claim 1 which has said ion conductive layer further containing (d) an ultraviolet absorbing compound having an ethylenic double bond.

3. The electrochromic device according to claim 1 wherein said bipyridinium compound represented by formula (1) wherein $R^1$ is selected from the group consisting of hydrogen and methyl group, $R^2$ is selected from the group consisting of methylene, ethylene, tetramethylene, propylene, m-phenylene, p-phenylene, alkyl-substituted phenylene, biphenylene, naphthylene, oxymethylene and oxypropylene groups, $R^3$ is selected from the group consisting of methyl, ethyl, i-propyl, n-propyl, n-butyl, t-butyl, n-pentyl, n-hexyl, cyclohexyl, n-heptyl, n-octyl, benzyl and vinylbenzyl, and groups represented by $-(CH_2CH_2O)_2-$ and

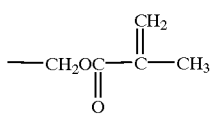

said amine compound represented by formula (2) and/or (3) wherein $R^4$ and $R^9$ are each independently selected from the group consisting of hydrogen or methyl group, $R^5$ and $R^{10}$ are each independently selected from the group consisting of groups represented by

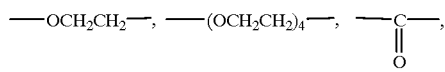

-continued

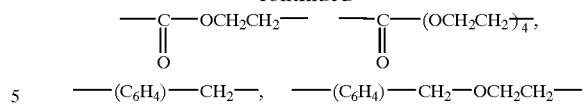

and $-(C_6H_4)-CH_2-(OCH_2CH_2)_{4}-$, $R^6$, $R^7$, $R^{11}$ and $R^{12}$ are each independently selected from the group consisting of methyl, ethyl, n-propyl, i-propyl, n-butyl, i-butyl, t-butyl, hexyl, heptyl, octyl, tolyl, ethyphenyl, phenyl, methoxyphenyl and ethoxyphenyl groups, $R^8$ and $R^{13}$ are each independently selected from the group consisting of methyl, ethyl, n-propyl, i-propyl, n-butyl, i-butyl, t-butyl, hexyl, heptyl, octyl, tolyl, ethylphenyl, phenyl, methoxyphenyl and ethoxyphenyl groups, and $Ar^1$ is selected from the group consisting of o-phenylene, m-phenylene, p-phenylene, alkyl-substituted phenylene, biphenylene and naphthylene groups.

4. The electrochromic device according to claim 1 wherein said precursor component of a polymeric solid electrolyte comprises a polymeric monomer and a supporting electrolyte.

5. The electrochromic device according to claim 1 wherein said polymeric monomer is selected from the group consisting of a monofunctional modified polyalkylene oxide represented by the formula (18)

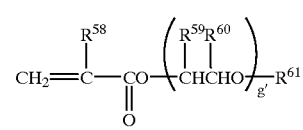

wherein $R^{58}$, $R^{59}$, $R^{60}$ and $R^{61}$ are each independently hydrogen or a $C_1$–$C_5$ alkyl group and g' is an integer of greater than 1; a difunctional modified polyalkylene oxide represented by the formula (19)

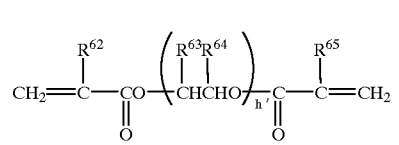

wherein $R^{62}$, $R^{63}$, $R^{64}$ and $R^{65}$ are each independently hydrogen or a $C_1$–$C_5$ alkyl group and h' is an integer of greater than 1, and a polyfunctional modified polyalkylene oxide represented by the formula (20)

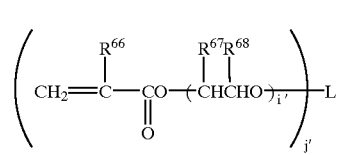

wherein $R^{66}$, $R^{67}$ and $R^{68}$ are each independently hydrogen or a $C_1$–$C_5$ alkyl group, i' is an integer of greater than 1, j' is an integer of 2 to 4 and L is a connecting group of valence indicated by q.

6. The electrochromic device according to claim 5 wherein said polymeric monomer contains said difunctional polyoxyalkylene oxide and/or said polyfunctional in a total amount of 0.1 to 20 part by weight, of 100 parts by weight of said monofunctional polyoxyalkylene oxide.

* * * * *